US010764421B2

(12) United States Patent
Antonopoulos et al.

(10) Patent No.: US 10,764,421 B2
(45) Date of Patent: *Sep. 1, 2020

(54) ADAPTER DEVICES FOR ENHANCING THE FUNCTIONALITY OF OTHER DEVICES

(71) Applicant: Keyssa Systems, Inc., Campbell, CA (US)

(72) Inventors: Nicholas A. Antonopoulos, San Jose, CA (US); Roger D. Isaac, San Jose, CA (US); Mariel van Tatenhove, Santa Clara, CA (US)

(73) Assignee: KEYSSA SYSTEMS, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,360

(22) Filed: Aug. 5, 2019

(65) Prior Publication Data

US 2020/0014788 A1    Jan. 9, 2020

Related U.S. Application Data

(63) Continuation of application No. 15/802,969, filed on Nov. 3, 2017, now Pat. No. 10,375,221, which is a
(Continued)

(51) Int. Cl.
*H04M 1/725* (2006.01)
*G06F 13/38* (2006.01)
*G06F 13/40* (2006.01)

(52) U.S. Cl.
CPC ...... *H04M 1/72527* (2013.01); *G06F 13/385* (2013.01); *G06F 13/4022* (2013.01);
(Continued)

(58) Field of Classification Search
CPC .............. H04M 1/72527; G06F 13/385; G06F 13/4022; G06F 2213/3814; Y02D 10/14; Y02D 10/151
See application file for complete search history.

(56) References Cited

U.S. PATENT DOCUMENTS 3,635,082 A    1/1972  Prellwitz et al.
3,762,221 A   10/1973  Coulthard
(Continued)

FOREIGN PATENT DOCUMENTS

CN    1503523 A    6/2004
CN    1505301 A    6/2004
(Continued)

OTHER PUBLICATIONS

"Understanding the FCC Regulations for Low-Power Non-Licensed Transmitters", Office of Engineering and Technology, Federal Communications Commission, OET Bulletin No. 63, Oct. 1993, 34 pages.
(Continued)

*Primary Examiner* — Brandon J Miller
(74) *Attorney, Agent, or Firm* — Van Court & Aldridge LLP

(57) ABSTRACT

An adapter may facilitate easy and swift data transfer amongst two previously incompatible electronic devices. Such an adapter may be operative to communicate data with a first of the two electronic devices using a contactless communication link and a first communication protocol and to communicate data with a second of the two electronic devices using a mechanical communication link and/or using a second communication protocol that is different than the first communication protocol, such that data may be transferred between the first and second electronic devices via the adapter. The adapter may be communicatively coupled to both the first electronic device and the second electronic device at the same time. The adapter may rapidly transition between communicating data with the first device and communicating data with the second device (e.g., without altering a physical connection between the adapter and one of the first and second devices during such a transition).

14 Claims, 9 Drawing Sheets

Related U.S. Application Data continuation of application No. 15/427,707, filed on Feb. 8, 2017, now Pat. No. 9,813,539, which is a continuation of application No. 14/701,521, filed on Apr. 30, 2015, now Pat. No. 9,602,648.

(52) U.S. Cl.
CPC ...... *G06F 2213/3814* (2013.01); *Y02D 10/14* (2018.01); *Y02D 10/151* (2018.01)

(56) References Cited

U.S. PATENT DOCUMENTS

| | | |
|---|---|---|
| 3,796,831 A | 3/1974 | Bauer |
| 4,485,312 A | 11/1984 | Kusakabe et al. |
| 4,497,068 A | 1/1985 | Fischer |
| 4,694,504 A | 9/1987 | Porter et al. |
| 4,708,021 A | 11/1987 | Braun et al. |
| 4,946,237 A | 8/1990 | Arroyo et al. |
| 4,976,154 A | 12/1990 | Schneider et al. |
| 5,021,759 A | 6/1991 | Gamand et al. |
| 5,056,111 A | 10/1991 | Duling et al. |
| 5,093,692 A | 3/1992 | Su et al. |
| 5,164,942 A | 11/1992 | Kamerman et al. |
| 5,202,976 A | 4/1993 | Hansen et al. |
| 5,543,808 A | 8/1996 | Feigenbaum et al. |
| 5,570,415 A | 10/1996 | Stretton et al. |
| 5,621,913 A | 4/1997 | Tuttle et al. |
| 5,684,721 A | 11/1997 | Swoboda et al. |
| 5,754,948 A | 5/1998 | Metze |
| 5,764,518 A | 6/1998 | Collins |
| 5,773,878 A | 6/1998 | Lim et al. |
| 5,825,240 A | 10/1998 | Geis et al. |
| 5,943,374 A | 8/1999 | Kokuryo et al. |
| 5,956,626 A | 9/1999 | Kaschke et al. |
| 6,252,767 B1 | 6/2001 | Carlson |
| 6,304,176 B1 | 10/2001 | Discenzo |
| 6,351,237 B1 | 2/2002 | Martek et al. |
| 6,373,447 B1 | 4/2002 | Rostoker et al. |
| 6,490,443 B1 | 12/2002 | Freeny, Jr. |
| 6,492,973 B1 | 12/2002 | Kuroki et al. |
| 6,534,784 B2 | 3/2003 | Eliasson et al. |
| 6,542,720 B1 | 4/2003 | Tandy |
| 6,591,200 B1 | 7/2003 | Cohen et al. |
| 6,607,136 B1 | 8/2003 | Atsmon et al. |
| 6,650,649 B1 | 11/2003 | Muhammad et al. |
| 6,718,163 B2 | 4/2004 | Tandy |
| 6,898,183 B1 | 5/2005 | Garakani |
| 6,915,529 B1 | 7/2005 | Suematsu et al. |
| 6,920,416 B1 | 7/2005 | Swoboda et al. |
| 6,933,930 B2 | 8/2005 | Devige et al. |
| 6,967,347 B2 | 11/2005 | Estes et al. |
| 6,988,200 B2 | 1/2006 | Iwamoto |
| 7,107,019 B2 | 9/2006 | Tandy |
| 7,109,682 B2 | 9/2006 | Takagi et al. |
| 7,196,317 B1 | 3/2007 | Meissner, II et al. |
| 7,263,034 B2 | 8/2007 | Ramenzoni |
| 7,268,290 B2 | 9/2007 | Parsons et al. |
| 7,311,526 B2 | 12/2007 | Rohrbach et al. |
| 7,369,532 B2 | 5/2008 | Silvester |
| 7,499,462 B2 | 3/2009 | MacMullan et al. |
| 7,512,395 B2 | 3/2009 | Beukema et al. |
| 7,517,222 B2 | 4/2009 | Rohrbach et al. |
| 7,522,878 B2 | 4/2009 | Baarman |
| 7,593,708 B2 | 9/2009 | Tandy |
| 7,597,250 B2 | 10/2009 | Finn |
| 7,598,923 B2 | 10/2009 | Hardacker et al. |
| 7,612,630 B2 | 11/2009 | Miller |
| 7,617,342 B2 | 11/2009 | Rofougaran |
| 7,645,143 B2 | 1/2010 | Rohrbach et al. |
| 7,656,205 B2 | 2/2010 | Chen et al. |
| 7,760,045 B2 | 7/2010 | Kawasaki |
| 7,761,092 B2 | 7/2010 | Desch et al. |
| 7,768,457 B2 | 8/2010 | Pettus et al. |
| 7,769,347 B2 | 8/2010 | Louberg et al. |
| 7,778,621 B2 | 8/2010 | Tandy |
| 7,791,167 B1 | 9/2010 | Rofougaran |
| 7,826,804 B1 | 11/2010 | Wright et al. |
| 7,859,396 B2 | 12/2010 | Monroe |
| 7,881,675 B1 | 2/2011 | Gazdzinski |
| 7,885,422 B2 | 2/2011 | Sinai |
| 7,889,022 B2 | 2/2011 | Miller |
| 7,907,924 B2 | 3/2011 | Kawasaki |
| 7,928,525 B2 | 4/2011 | Bilger et al. |
| 7,929,474 B2 | 4/2011 | Pettus et al. |
| 7,975,079 B2 | 7/2011 | Bennett et al. |
| 7,979,592 B1 | 7/2011 | Pettey et al. |
| 8,013,610 B1 | 9/2011 | Merewether et al. |
| 8,014,416 B2 | 9/2011 | Ho et al. |
| 8,019,352 B2 | 9/2011 | Rappaport et al. |
| 8,019,616 B2 | 9/2011 | Lee et al. |
| 8,036,629 B2 | 10/2011 | Tandy |
| 8,041,227 B2 | 10/2011 | Holcombe et al. |
| 8,059,572 B2 | 11/2011 | Kim et al. |
| 8,060,102 B2 | 11/2011 | Gazzola |
| 8,086,174 B2 | 12/2011 | Mohebbi |
| 8,087,939 B2 | 1/2012 | Rohrbach et al. |
| 8,121,542 B2 | 2/2012 | Zack et al. |
| 8,135,367 B2 | 3/2012 | Rofougaran et al. |
| 8,170,486 B2 | 5/2012 | Olofsson |
| 8,183,935 B2 | 5/2012 | Milano et al. |
| 8,190,025 B2 | 5/2012 | Presley et al. |
| 8,229,566 B2 | 7/2012 | Li |
| 8,339,096 B2 | 12/2012 | Osada |
| 8,416,721 B1 | 4/2013 | Chen |
| 8,423,791 B1* | 4/2013 | Yu ................... H04L 63/1441 713/189 |
| 8,494,375 B2 | 7/2013 | Walter |
| 8,554,136 B2 | 10/2013 | McCormack |
| 8,594,584 B2 | 11/2013 | Greene et al. |
| 8,626,249 B2 | 1/2014 | Ungari et al. |
| 8,714,459 B2 | 5/2014 | McCormack et al. |
| 9,062,531 B2 | 6/2015 | Jones |
| 9,191,263 B2 | 11/2015 | McCormack et al. |
| 9,219,956 B2 | 12/2015 | McCormack et al. |
| 9,231,700 B2 | 1/2016 | Walter |
| 9,301,337 B2 | 3/2016 | Brown et al. |
| 9,386,542 B2 | 7/2016 | Russell et al. |
| 9,525,463 B2 | 12/2016 | McCormack et al. |
| 9,565,495 B2 | 2/2017 | McCormack et al. |
| 9,602,648 B2* | 3/2017 | Antonopoulos .. H04M 1/72527 |
| 9,813,539 B2* | 11/2017 | Antonopoulos .. H04M 1/72527 |
| 9,819,397 B2 | 11/2017 | McCormack et al. |
| 10,375,221 B2* | 8/2019 | Antonopoulos .... G06F 13/4022 |
| 2002/0136233 A1 | 9/2002 | Chen et al. |
| 2003/0117998 A1 | 6/2003 | Sala et al. |
| 2003/0191623 A1 | 10/2003 | Salmonsen |
| 2004/0049797 A1 | 3/2004 | Salmonsen |
| 2004/0213356 A1 | 10/2004 | Burke |
| 2004/0214621 A1 | 10/2004 | Leon et al. |
| 2004/0242258 A1 | 12/2004 | Kim |
| 2005/0072236 A1 | 4/2005 | Heyman et al. |
| 2005/0109841 A1 | 5/2005 | Ryan et al. |
| 2005/0140436 A1 | 6/2005 | Ichitsubo et al. |
| 2005/0157085 A1 | 7/2005 | Silverbrook et al. |
| 2005/0162338 A1 | 7/2005 | Ikeda et al. |
| 2005/0238068 A1 | 10/2005 | Tang et al. |
| 2005/0270906 A1 | 12/2005 | Ramenzoni |
| 2006/0014563 A1* | 1/2006 | Cheng ................ H04M 1/0254 455/557 |
| 2006/0019679 A1 | 1/2006 | Rappaport et al. |
| 2006/0038168 A1 | 2/2006 | Estes et al. |
| 2006/0068750 A1 | 3/2006 | Burr |
| 2006/0082518 A1 | 4/2006 | Ram |
| 2006/0113955 A1 | 6/2006 | Nunally |
| 2006/0128372 A1 | 6/2006 | Gazzola |
| 2006/0159158 A1 | 7/2006 | Moore et al. |
| 2006/0179079 A1 | 8/2006 | Kolehmainen |
| 2006/0195695 A1 | 8/2006 | Keys |
| 2006/0232483 A1 | 10/2006 | Iwai et al. |
| 2006/0258289 A1 | 11/2006 | Dua |
| 2007/0024504 A1 | 2/2007 | Matsunaga |
| 2007/0038434 A1 | 2/2007 | Cvetko |
| 2007/0056032 A1 | 3/2007 | Valenci |
| 2007/0063056 A1 | 3/2007 | Gaucher et al. |

(56) References Cited

U.S. PATENT DOCUMENTS

| | | |
|---|---|---|
| 2007/0073585 A1 | 3/2007 | Apple et al. |
| 2007/0073935 A1 | 3/2007 | Kim et al. |
| 2007/0124150 A1 | 5/2007 | Sinai |
| 2007/0141985 A1 | 6/2007 | Parkkinen et al. |
| 2007/0155489 A1 | 7/2007 | Beckley et al. |
| 2007/0207756 A1 | 9/2007 | Qi et al. |
| 2007/0229270 A1 | 10/2007 | Rofougaran |
| 2007/0242621 A1 | 10/2007 | Nandagopalan et al. |
| 2007/0278632 A1 | 12/2007 | Zhao et al. |
| 2007/0293193 A1 | 12/2007 | Ramsten et al. |
| 2007/0293267 A1 | 12/2007 | Chang |
| 2008/0055303 A1 | 3/2008 | Ikeda |
| 2008/0086775 A1 | 4/2008 | Repasi et al. |
| 2008/0089667 A1 | 4/2008 | Grady et al. |
| 2008/0112101 A1 | 5/2008 | McElwee et al. |
| 2008/0146342 A1 | 6/2008 | Harvey et al. |
| 2008/0150799 A1 | 6/2008 | Hemmi et al. |
| 2008/0159243 A1 | 7/2008 | Rofougaran |
| 2008/0192726 A1 | 8/2008 | Mahesh et al. |
| 2008/0195788 A1 | 8/2008 | Tamir et al. |
| 2008/0205664 A1 | 8/2008 | Kim et al. |
| 2008/0290959 A1 | 11/2008 | Ali et al. |
| 2008/0300572 A1 | 12/2008 | Rankers et al. |
| 2008/0311871 A1 | 12/2008 | Qi et al. |
| 2009/0006677 A1 | 1/2009 | Rofougaran |
| 2009/0009337 A1 | 1/2009 | Rofougaran |
| 2009/0013210 A1 | 1/2009 | McIntosh et al. |
| 2009/0016290 A1 | 1/2009 | Chion et al. |
| 2009/0037628 A1 | 2/2009 | Rofougaran |
| 2009/0067198 A1 | 3/2009 | Graham et al. |
| 2009/0076825 A1 | 3/2009 | Bradford et al. |
| 2009/0088077 A1 | 4/2009 | Brown et al. |
| 2009/0094506 A1 | 4/2009 | Lakkis |
| 2009/0098826 A1 | 4/2009 | Zack et al. |
| 2009/0110131 A1 | 4/2009 | Bornhoft et al. |
| 2009/0128090 A1 | 5/2009 | Bi |
| 2009/0175323 A1 | 7/2009 | Chung |
| 2009/0216518 A1 | 8/2009 | Errickson et al. |
| 2009/0216927 A1 | 8/2009 | Errickson et al. |
| 2009/0218407 A1 | 9/2009 | Rofougaran |
| 2009/0218701 A1 | 9/2009 | Rofougaran |
| 2009/0220192 A1 | 9/2009 | Presley et al. |
| 2009/0220233 A1 | 9/2009 | Presley et al. |
| 2009/0236701 A1 | 9/2009 | Sun et al. |
| 2009/0239392 A1 | 9/2009 | Sumitomo et al. |
| 2009/0239483 A1 | 9/2009 | Rofougaran |
| 2009/0245808 A1 | 10/2009 | Rofougaran |
| 2009/0273560 A1 | 11/2009 | Kalanithi et al. |
| 2009/0326606 A1 | 12/2009 | Li |
| 2010/0127804 A1 | 5/2010 | Vouloumanos |
| 2010/0159829 A1 | 6/2010 | McCormack |
| 2010/0167645 A1 | 7/2010 | Kawashimo |
| 2010/0180284 A1* | 7/2010 | Ross ................... G06F 9/541 |
| | | 719/330 |
| 2010/0202499 A1 | 8/2010 | Lee et al. |
| 2010/0231452 A1 | 9/2010 | Babakhani et al. |
| 2010/0265648 A1 | 10/2010 | Hirabayashi |
| 2010/0283700 A1 | 11/2010 | Rajanish et al. |
| 2010/0285634 A1 | 11/2010 | Rofougaran |
| 2010/0297954 A1 | 11/2010 | Rofougaran et al. |
| 2011/0047588 A1 | 2/2011 | Takeuchi et al. |
| 2011/0092212 A1 | 4/2011 | Kubota |
| 2011/0150487 A1 | 6/2011 | Walter |
| 2011/0161530 A1 | 6/2011 | Pietri et al. |
| 2011/0181484 A1 | 7/2011 | Pettus et al. |
| 2011/0207425 A1 | 8/2011 | Juntunen et al. |
| 2011/0285606 A1 | 11/2011 | Graauw et al. |
| 2011/0286703 A1 | 11/2011 | Kishima et al. |
| 2011/0311231 A1 | 12/2011 | Ridgway et al. |
| 2012/0009877 A1 | 1/2012 | Zeinstra et al. |
| 2012/0028582 A1 | 2/2012 | Tandy |
| 2012/0064664 A1 | 3/2012 | Yamazaki et al. |
| 2012/0072620 A1 | 3/2012 | Jeong et al. |
| 2012/0083137 A1 | 4/2012 | Rohrbach et al. |
| 2012/0084470 A1 | 4/2012 | Antwerpen et al. |
| 2012/0093041 A1 | 4/2012 | Takeda et al. |
| 2012/0106683 A1 | 5/2012 | Zhao |
| 2012/0109303 A1 | 5/2012 | Capote |
| 2012/0110635 A1 | 5/2012 | Harvey et al. |
| 2012/0159144 A1* | 6/2012 | Sengupta ................ G06F 9/441 |
| | | 713/100 |
| 2012/0263244 A1 | 10/2012 | Kyles et al. |
| 2012/0265918 A1 | 10/2012 | Nakajima et al. |
| 2012/0286049 A1 | 11/2012 | McCormack et al. |
| 2012/0290760 A1 | 11/2012 | McCormack et al. |
| 2012/0295539 A1 | 11/2012 | McCormack et al. |
| 2012/0307932 A1 | 12/2012 | McCormack et al. |
| 2012/0319496 A1 | 12/2012 | McCormack et al. |
| 2012/0319890 A1 | 12/2012 | McCormack et al. |
| 2013/0063873 A1 | 3/2013 | Wodrich et al. |
| 2013/0070817 A1 | 3/2013 | McCormack et al. |
| 2013/0080663 A1 | 3/2013 | Rabii et al. |
| 2013/0106673 A1 | 5/2013 | McCormack et al. |
| 2013/0109303 A1 | 5/2013 | McCormack et al. |
| 2013/0155170 A1* | 6/2013 | Eichen .................. H04W 76/10 |
| | | 348/14.02 |
| 2013/0176401 A1 | 7/2013 | Monari et al. |
| 2013/0217336 A1 | 8/2013 | McCormack et al. |
| 2013/0229362 A1 | 9/2013 | Liu et al. |
| 2013/0266026 A1 | 10/2013 | McCormack et al. |
| 2013/0266154 A1 | 10/2013 | McCormack et al. |
| 2014/0023376 A1 | 1/2014 | Walter |
| 2014/0024314 A1 | 1/2014 | McCormack et al. |
| 2014/0108870 A1 | 4/2014 | Aravindhan |
| 2014/0169486 A1* | 6/2014 | McCormack ........ G09G 3/2096 |
| | | 375/259 |
| 2014/0170982 A1 | 6/2014 | McCormack et al. |
| 2014/0252876 A1 | 9/2014 | Riezebos et al. |
| 2014/0273837 A1 | 9/2014 | McCormack et al. |
| 2014/0351833 A1 | 11/2014 | Teng et al. |
| 2015/0063337 A1* | 3/2015 | Kang ..................... G06F 13/385 |
| | | 370/338 |
| 2015/0227485 A1* | 8/2015 | Maung ................ G06F 13/4022 |
| | | 710/316 |
| 2015/0229751 A1* | 8/2015 | Scott .................... H04W 76/14 |
| | | 455/414.1 |
| 2015/0356045 A1 | 12/2015 | Soffer |
| 2015/0369037 A1 | 12/2015 | Jones |
| 2016/0179648 A1 | 6/2016 | Srivastava et al. |
| 2016/0239075 A1 | 8/2016 | Miyaoka et al. |
| 2017/0068627 A1* | 3/2017 | Vajravel ................ G06F 13/385 |
| 2017/0142516 A1 | 5/2017 | McCormack et al. |

FOREIGN PATENT DOCUMENTS

| | | |
|---|---|---|
| CN | 1848021 A | 10/2006 |
| CN | 102064857 B | 5/2011 |
| CN | 102195111 A | 9/2011 |
| EP | 2216944 A1 | 8/2010 |
| EP | 2360923 A1 | 8/2011 |
| EP | 2434576 B1 | 3/2012 |
| EP | 2479843 A1 | 7/2012 |
| JP | 2008-252566 A | 10/2008 |
| WO | 2005/069585 A1 | 7/2005 |
| WO | 2007/131101 A2 | 11/2007 |
| WO | 2011/028730 | 3/2011 |
| WO | 2014/130146 A1 | 8/2014 |

OTHER PUBLICATIONS

Bluetooth Audio Dongle Receiver 3.5mm Stereo, http://www.meritline.com, Feb. 8, 2013, 2 pages.

Bluetooth Headset, Jabra clipper, Item No. 100-96800000-60, Jul. 28, 2010, 7 pages.

ECMA Standard: "Standard ECMA-398: Close Proximity Electric Induction Wireless Communications." Jun. 2011, pp. 1-99, http://www.ecma-international.org/publications/standards/Ecma-398.htm.

Enumeration: How the Host Learns about Devices, Jan Axelson's Lakeview Research, retrieved on Dec. 31, 2012, 7 pages.

Interfacing I2S-Compatible Audio Devices to the ADSP-21065L Serial Ports, Apr. 2, 1999, 37 pages.

(56) References Cited

OTHER PUBLICATIONS

International Search Report & Written Opinion from PCT/US13/27835, dated May 3, 2013, 12 pages.
International Search Report and Written Opinion of the International Search Authority, PCT/US2013/055487, dated Jan. 24, 2014, 9 pages.
PCM510x 2VRMS DirectPath™, 1121106/IOOdB Audio Stereo DAC with 32-bit, 384kHz PCM Interface by Texas Instruments, 2011, 33 pages.
Philips Semiconductors, I2S Bus Specification, Jun. 5, 1996, pp. 1-7.
Silicon Labs USB-to-12S Audio Bridge Chip Brings Plug-and-Play Simplicity to Audio Design, Cision Wire, Oct. 17, 2012, 2 pages.
Universal Serial Bus, Wikipedia, 2012 (32 pages).
USB in a NutShell, retrieved on Dec. 24, 2012, 43 pages, http://beyondlogic.org/usbnutshell/usb1.shtml.
USB Made Simple, MQP Electronics Ltd, 2006-2008 (78 pages).
Wireless HD™: "WirelessHD Specification Version 1.1 Overview." May 2010, pp. 1-95, http://www.wirelesshd.org/pdfs/WirelessHD-Specification-Overview-v1.1May2010.pdf.

* cited by examiner

ESTABLISHING A FIRST COMMUNICATIONS LINK BETWEEN A FIRST CONNECTOR OF AN ADAPTER DEVICE AND A FIRST ELECTRONIC DEVICE
1802

MECHANICALLY COUPLING A SECOND CONNECTOR OF THE ADAPTER DEVICE TO THE SECOND ELECTRONIC DEVICE FOR ENABLING A SECOND COMMUNICATIONS LINK BETWEEN THE SECOND CONNECTOR OF THE ADAPTER DEVICE AND THE SECOND ELECTRONIC DEVICE
1804

WHILE MAINTAINING BOTH THE ESTABLISHED FIRST COMMUNICATIONS LINK AND THE ESTABLISHED SECOND COMMUNICATIONS LINK, CHANGING THE STATE OF A COMMUNICATIONS PATH BETWEEN THE SECOND CONNECTOR AND A MEMORY COMPONENT OF THE ADAPTER DEVICE
1806

1800
FIG. 13

ADAPTER DEVICES FOR ENHANCING THE FUNCTIONALITY OF OTHER DEVICES

This application is a continuation of U.S. patent application Ser. No. 15/802,969, filed Nov. 3, 2017 (now U.S. Pat. No. 10,375,221), which is a continuation of U.S. patent application Ser. No. 15/427,707, filed Feb. 8, 2017 (now U.S. Pat. No. 9,813,539), which is a continuation of U.S. patent application Ser. No. 14/701,521, filed Apr. 30, 2015 (now U.S. Pat. No. 9,602,648). Each of these earlier applications is hereby incorporated by reference herein in its entirety.

TECHNICAL FIELD

The present disclosure relates to adapter devices and more specifically to enhancing functionality of a device with an adapter device.

BACKGROUND

Electronic devices can be "connected" together to enable data transfer between the devices. Typically, the connection between two devices can be a wired connector or a wireless connection. A wired connector, such as a Universal Serial Bus (USB) connector, may typically be point-to-point, and may require mechanical connectors at each device. A wireless connection, such as a WiFi or Bluetooth connection, can operate in a "broadcast" mode, where one device can communicate simultaneously with several other devices, over a radio frequency (RF) link, which may typically be in the range of 700 MHz to 5.8 GHz. Devices containing these connectors and connections are limited to communicating data according to the protocols associated with those connection mechanisms. As a result, such devices are not able to communicate data according to alternative protocols that may be available.

BRIEF SUMMARY

Apparatus, systems, methods, and related computer program products for adapter devices that enhance functionality of a device are provided herein.

In some embodiments, there is provided an adapter device for use in communicating with a first electronic device and a second electronic device. The adapter device may include an adapter memory component, a first connector operative to enable a first communications link with the first electronic device, a second connector operative to mechanically couple to the second electronic device to enable a second communications link with the second electronic device, and an adapter host subsystem communicatively coupled to each one of the adapter memory component, the first connector, and the second connector, wherein, while both the first communications link is enabled and the second connector is mechanically coupled to the second electronic device, the adapter host subsystem is operative to switch between enabling a first communications path between the adapter memory component and the first communications link via the first connector and enabling a second communications path between the adapter memory component and the second communications link via the second connector.

In some other embodiments, there is provided an adapter device for use in communicating with a first electronic device and a second electronic device. The adapter device may include an adapter memory component, a first connector operative to maintain a first communications link with the first electronic device, a second connector operative to maintain a second communications link with the second electronic device, and an adapter host subsystem. The adapter host subsystem may include a switch module communicatively coupled to the second connector and a hub. The hub may include an upstream port and a plurality of downstream ports. A first portion of the upstream port is communicatively coupled to the first connector; and a second portion of the upstream port is communicatively coupled to the switch module.

In some other embodiments, there is provided a method for enabling an adapter device to communicate with a first electronic device and a second electronic device, where the method is implemented by the adapter device. The method may include establishing a first communications link between a first connector of the adapter device and the first electronic device, mechanically coupling a second connector of the adapter device to the second electronic device for enabling a second communications link between the second connector of the adapter device and the second electronic device, and, while both the first communications link is established and the second connector is mechanically coupled to the second electronic device, changing the state of a communications path between the second connector and a memory component of the adapter device.

In some other embodiments, for use with any one of a plurality of different user devices each including a first device connector and for use with a modular adapter including a first adapter connector and at least one contactless communication unit, there is provided a device specific shell that may include a structure with a configuration amenable to being attached to one of the user devices. The structure includes a module retaining region that includes a first shell connector operable to mate with the first adapter connector. The device specific shell may also include a second shell connector coupled to the structure and operable to mate with the first device connector, wherein the first and second shell connectors are electrically coupled.

In some other embodiments, for use with any one of a plurality of device specific shells each including a structural configuration designed for a specific user device, a modular retaining region, and a first shell connector, a modular adapter is provided that may include a housing designed to fit in the modular retaining region, a first adapter connector coupled to the housing and operable to mate with the first shell connector, and at least one contactless communications unit mounted within the housing, the at least one contactless communications unit operable to contactlessly communicate data according to any one of a plurality of different protocols, wherein the at least one contactless communications unit is instructed to implement a state machine specific to a selected one of the protocols in order to establish a communications link according to selected protocol.

A further understanding of the nature and advantages of the embodiments discussed herein may be realized by reference to the remaining portions of the specification and the drawings.

BRIEF DESCRIPTION OF THE DRAWINGS

The discussion below makes reference to the following drawings, which are not necessarily drawn to scale, in which like reference characters may refer to like parts throughout, and in which:

FIG. 13 shows an illustrative flowchart, according to an embodiment.

DETAILED DESCRIPTION

Figure 1:
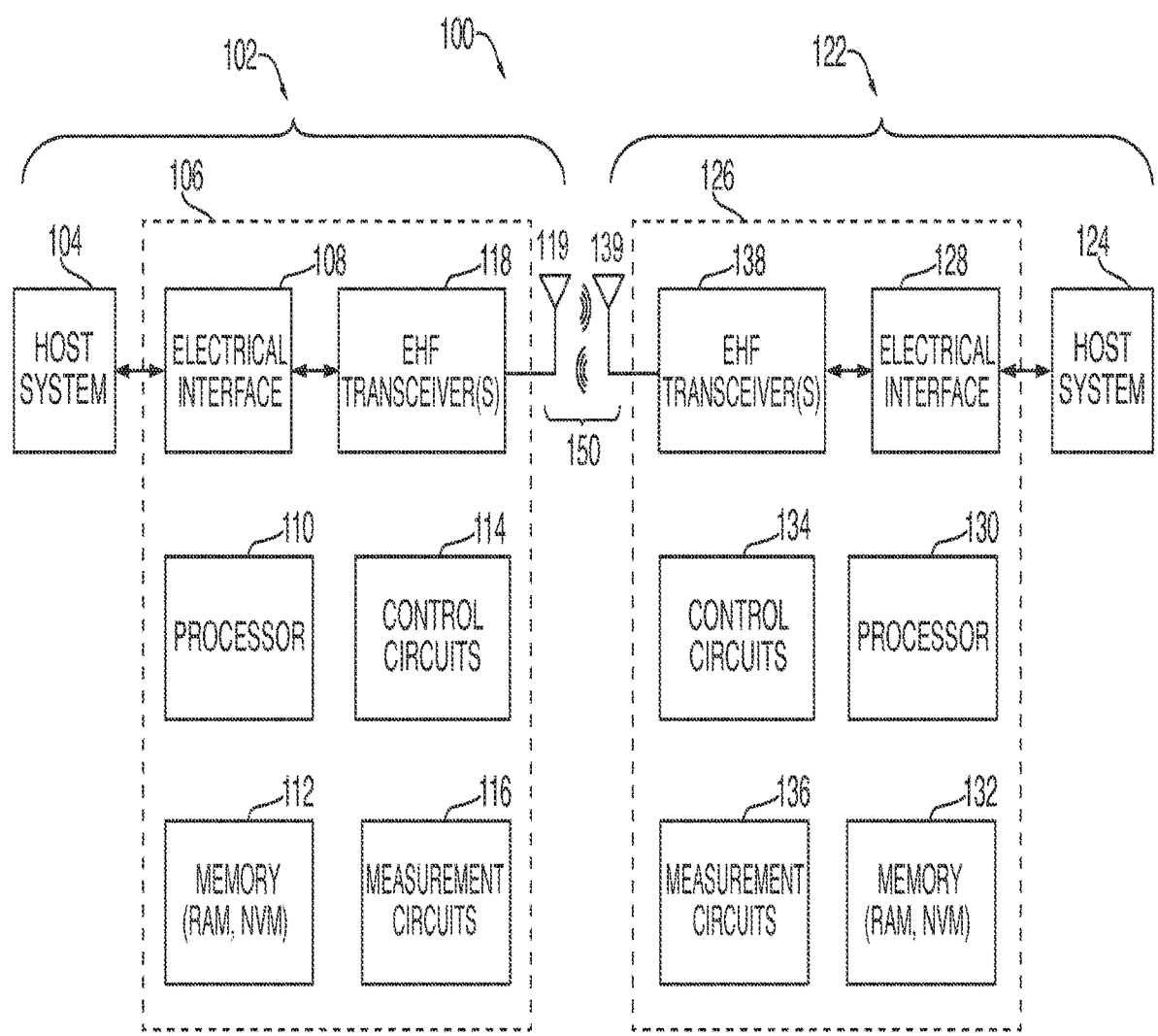
FIG. 1 illustrates a communications system, according to an embodiment.

Illustrative embodiments are now described more fully hereinafter with reference to the accompanying drawings, in which representative examples are shown. The disclosed adaptive device may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

For example, embodiments discussed herein may refer to apparatus, systems, methods, and related computer program products for establishing extremely high frequency (EHF) contactless communications links using a contactless communications interface. An EHF contactless communication link may serve as an alternative to conventional board-to-board and device-to-device connectors. The link may be a low-latency protocol-transparent communication link that may be capable of supporting a range of data rates, such as at least 5 Gb/s. The link may be established through a close proximity coupling between devices, each of which may include at least one EHF communication unit. Each EHF unit may progress through a series of steps before data can be transferred between the devices. These steps may be controlled by one or more state machines that may be implemented in each EHF communication unit. Some of these state machines or other state machines may be selected based to the interfaces they are implementing. These state machines may progress through state transitions for each EHF unit in accordance with the protocol of the interfaces they are implementing. There may be several embodiments of these state machines, including, but not limited to, interface protocols, such as USB 2.0, USB 3.0, USB 3.1, USB 3/2 Auto switchable protocols, USB Type C, and USB On-The-Go (OTG) protocol. Other industry implementations of interfaces, such as USB and DisplayPort (DP) over wired or wireless communication links, such as Wireless-USB (USB over RF links) or Wi-Fi Direct (for DP), may require a higher level of intervention from the host processors that may impose additional layering of driver software in the industry standard kernel stack, such as iOS, Android, Windows, etc. This can significantly increase the effort required for adoption of such implementations, compared to the implementation of those peripheral interfaces using embodiments described herein.

Another difference between using an EHF communication link and conventional wired and wireless links is that the EHF communication link is not constrained by the same electrical and software requirements of conventional wired and wireless links to enable a particular protocol. Thus, the EHF communications link is protocol agnostic in that it does not have to abide by the same rules, parameters, or other characteristics that wired and wireless links must satisfy in order to function properly. By way of example, a USB 2.0 wired link requires a particular mechanical interface, electrical requirements (e.g., resistance values, voltages, etc.), and various protocol specific link layers in order to establish a USB 2.0 protocol link; whereas an EHF communications link can be instructed to use the EHF state machine specifically designated for USB 2.0 in order to establish a USB 2.0 protocol link. If it is desired for the EHF communications link to be a USB 3.0 link, it can be instructed to use the EHF state machine specifically designed for USB 3.0 without requiring the particular mechanical interface, electrical requirements (e.g., resistance values, voltages, etc.), and various protocol specific link layers that are typically associated with the USB 3.0 protocol. Thus, the USB 2.0 wired link is permanently forced to operate only according to USB 2.0 (e.g., because its host system has been hard-wired and programmed according to the protocol specific requirements and it includes an electromechanical connector). In the event, for example, a USB 3.0 wired connector is mated with the USB 2.0 wired connector, the protocol link existing between both wired connectors will be forced to resolve to USB 2.0. In contrast to the wired USB 2.0 link, if the EHF communications link is used, it can load the appropriate state machine to provide a USB 3.0 protocol link.

Yet another difference in implementing industry standard peripheral interfaces, such as USB over contactless EHF communication links, utilizing the methods described in this document is the fact that the operating power of the system described herein may be significantly lower than that required in conventional implementations.

The EHF communication units may be integrated into various adapter device embodiments described herein that enhance the functionality of user devices and/or base devices while simultaneously adhering to any protocol requirements of those devices. Thus, although a user device may be limited to using its protocols for transferring data, it is provided access to other protocols via the adapter device, such that data stored in the adapter device and accessible to the device can be transferred to another device (e.g., base device) using one of the other protocols. The one or more other protocols may be supported by the EHF communication units, which advantageously enable the adapter device to be unencumbered with conventional electromechanical connectors, including their physical connection requirements and their electrical connection requirements. The elimination of the encumbrance is further realized by the adapter device's ability to be simultaneously electrically coupled to at least the user device and the base device and support data transfer between the user device and the adapter device, between the base device and the adapter device, and between the user device and the base device, without requiring a user to physically disconnect the adapter device from one device and connect it to another device in order to establish a data transfer link. The adapter device can electronically maintain and manage two or more data transfer links with two simultaneously electrically coupled devices.

The adapter device, coupled with its EHF contactless communications unit, enables various use cases for transferring data. For example, in one embodiment, the adapter device may function as a high speed data sharing device that transmits data in the fastest possible manner, given the constraints imposed on it by the user device and base device. For example, data may be rapidly transferred between the adapter device's local memory and a base device via the contactless interface, and the user device can access the adapter device's local memory using its protocol. This arrangement supports usage scenarios where a relatively large amount of data (e.g., a movie) is transferred between the adapter device and base device in a relatively short amount of time (e.g., a few seconds) when the user places the adapter device within data transfer proximity of the base device. For example, in embodiments where the adapter device is semi-permanently coupled to the user device such that the device and adapter user device can be physically handled as one integrated device, a user can place the integrated device in close proximity to the base device to effect rapid data transfer. Since the data transfer is contactless, the user need not fumble with cables to make a connection or fuss with inserting one mechanical connector into another mechanical connector.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of contactless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit at any suitable transfer data rates, such as in a range of 4 Gbits/s to 20 Gbits/s, or any other suitable data rate (e.g., at least data rates supported by USB 3.0 or USB 3.1 or USB Type C or USB SuperSpeed or USB SuperSpeed+ or Apple Lightning or Thunderbolt or any other suitable current or future protocol or standard). An example of an EHF communication unit may be an EHF comm-link chip. Throughout this disclosure, the terms comm-link chip and comm-link chip package may be used to refer to EHF antennas that may be embedded in integrated circuit (IC) chips or packages. Comm-link chips may be an example of a communication device, which may also be referred to as a contactless communication unit, a contactless communications transceiver unit (CCXU or EHF XCVR), and the like, whether or not they provide wireless communication and whether or not they operate in the EHF frequency band.

The acronym "EHF" may stand for Extremely High Frequency, and may refer to a portion of the electromagnetic (EM) spectrum, such as a portion in the range of 30 GHz to 300 GHz (gigahertz). The term "transceiver" may refer to a device such as an IC that may include a transmitter (Tx) and a receiver (Rx) so that the integrated circuit may be used to both transmit and receive information (data). Generally, a transceiver may be operable in a half-duplex mode (e.g., alternating between transmitting and receiving), a full-duplex mode (e.g., transmitting and receiving simultaneously), or configured as either a transmitter or a receiver. A transceiver may include separate integrated circuits for transmit and receive functions. The terms "contactless," "coupled pair," and "close proximity coupling" as used herein, may refer to EM rather than electrical (e.g., wired, contact-based) connections and transport of signals between entities (e.g., devices). As used herein, the term "contactless" may refer to a carrier-assisted, dielectric coupling system. A connection may be validated by proximity of one device to a second device. Multiple contactless transmitters and receivers may occupy a small space. A contactless link established with EMs may be channelized in contrast with a wireless link which typically may broadcast to several points.

The RF energy output by an EHF transceiver described herein may be designed to adhere to various requirements mandated by one or more governments or their agencies. For example, the FCC may promulgate requirements for certification for transmitting data in a RF frequency band.

"Standards" and related terms, such as "Standards-based", "Standards-based interfaces", "Standards-based protocols", "interface protocols," and the like, may refer to legacy or future interface standards or protocols that may include but are not limited to USB (e.g., USB 2.0, USB 3.0, USB 3.1, USB Type C, USB 3/2, or USB OTG, with SuperSpeed or SuperSpeed+ transfer modes), DP, Thunderbolt, HDMI, SATA/SAS, PCIe, Ethernet SGMII, Hypertransport, Quickpath, I2S, GPIO, I2C, and their extensions or revisions. For example, the term "interface protocol" may refer to the protocol being used by one system to communicate with another system. As a specific example, the interface protocol being used by a system may be a USB interface protocol; as such, the system may communicate according to the rules governing USB communications.

EHF communication systems described herein can selectively implement any one of the USB or other suitable standards by mapping appropriate USB (or other protocol) signal conditions over an EHF contactless communication link. It is to be understood that while USB may be predominantly referred to herein, any other suitable standard or protocol may be used.

The EHF contactless communication link may serve as an alternative to conventional board-to-board and device-to-device connectors, and as such may enable wired connection USB signaling protocols to be used in a non-wired environment provided by the EHF contactless communications link. Use of a USB protocol over the EHF communications link can be accomplished by establishing the EHF link between counterpart EHF communication units, and then by establishing the appropriate USB protocol or any other suitable protocol over the link. The link may be established by having each EHF unit progress through a series of steps controlled by one or more state machines that may be implemented in each EHF communication unit.

The communication system presented herein is unique in that the communication units may have the flexibility to provide broadband communication characteristics but at the same time consume much less power with a lot less complexity and cost than existing solutions. Maximizing bandwidth usage around a common carrier frequency may require the use of multiple communication units, each of which may operate as either a transmitter or a receiver at a certain period of time. Each of the units can operate in either full duplex mode or half duplex mode with the same carrier. The use of the same carrier (or substantially similar carrier frequency) for different communication units in the same system may require spatial separation of the communication units. In order for the communication units in the system to communicate efficiently and effectively with a partner system they ought to be able to synchronize their operations (and/or states). The communication units in the same system may communicate control information regarding the status or state using electrical signaling, while these same units may communicate with partner communication units (e.g., in a different system) through EHF signaling. Based on the requirements of a particular system, a specific communication unit may be powered up, based on a request from a host system, and this communication unit may be responsible for initiating link enablement of the communication unit(s) in the same system and/or in the partner system. The communication units may pass through multiple states, where the state transitions may partly depend on the state of one or more of the other communication units. This may require synchronization of the states in all communication units. In order to achieve this, the control information may pass through the communication units in a closed loop.

In addition, data from a host system that may be communicated through the communication units may be communicated transparently with little or no intervention from the host system. Control information that may be communicated between the EHF communication units over an EHF link may use similar signaling characteristics as data information that may be communicated between two host systems over the EHF link. For example, the control information may be sent over a EHF carrier with a modulation scheme that may be similar to the modulation scheme when data information may be sent between two host systems over the EHF link.

There may be several key advantages to the communication system presented herein. By physically separating communication units in the same system and/or by optimizing the connection distance for contactless communication, the communication units can operate over the same EHF frequency with minimal interference through spatial separation. The communication units may be simpler in design because many of the constraints from a typical wireless system (e.g., using multiple bands of frequencies for communication) may have been relaxed or altogether removed. For example, due to the close communication distance and minimal interference with neighboring units, the units can be designed to communicate with simple modulation of the EHF signal and no additional error detection or correction circuitry. In addition, an EHF transmit unit may be physically identical (e.g., the same silicon mask set) to an EHF receive unit and a single chip may be configured as a transmitter, a receiver, or may alternately be programmed to be either a transmitter or a receiver. By using a very similar design for all the communication units, development and implementation costs may be reduced.

State machine embodiments can enable interface protocols including, but not limited to USB 2.0, USB 3.0, USB 3.1, USB Type C, and/or USB 3/2 Auto switchable protocols, to be used in connection with the EHF contactless communication system. Thus, although the EHF contactless communication system may provide a non-wired, near field link, the interface protocols may behave in the same manner as a system that uses a wired, physical link. This advantageously may eliminate the need to use higher level intervention from host processors that may impose additional layering of driver software in industry standard kernel stacks (e.g., iOS, Android, Windows) in order to establish a USB interface. Thus, conventional industry implementations, which may require the higher level intervention, that may use interfaces such as USB and DP over wireless communication links such as Wireless-USB (e.g., USB over RF links) or Wi-Fi Direct (e.g., for DP) may require significant engineering effort in order to adopt such implementations and/or may require greater power consumption compared to the implementation of the same peripheral interfaces using embodiments described herein.

For example, a contactless communications transmitter unit (CCTU) for use in establishing a contactless communications link with a first contactless communications receiver unit (CCRU) that may be associated with a second USB device and for use in communicating with a second CCRU via at least one wired path may be provided. The CCTU can include several pins, wherein at least a first pin may be used to communicate with the second receiver unit via a wired path and at least a second pin may be used to communicate with a first USB device, a transducer for transmitting EHF contactless signals to the first receiver unit, and circuitry. The circuitry can be operative to execute a CCTU state machine that may track a state of the CCTU during the establishment of the contactless communications link, wherein the state machine may transition through a plurality of states in response to signals received by the first pin, wherein one of the plurality of states may include a capabilities state for determining a data transfer protocol. The circuitry can execute a USB state machine during the capabilities state to enable the first USB device to establish a USB connection with the second USB device via the contactless communication link, wherein the USB state machine may transition through a plurality of USB states in response to signals received by the at least a first pin and the at least a second pin. The circuitry can selectively transmit EHF signals, using the transducer, in response to a state transition in at least one of the CCTU state machine and the USB state machine.

As another example, a CCRU for use in establishing a contactless communications link with a first CCTU and for use in communicating with at least a second CCTU via at least one wired path may be provided. The CCRU can include several pins, wherein at least a first pin may be used to communicate with the second transmitter unit via a wired path and at least a second pin may be used to communicate with a first USB device, a transducer for receiving EHF contactless signals from the first transmitter unit, and circuitry. The circuitry can be operative to execute a CCRU state machine that may track the state of the CCRU during the establishment of the contactless communications link, wherein the state machine may transition through a plurality of states in response to signals that may be received by the transducer, wherein one of the plurality of states may include a capabilities state for determining a data transfer protocol. The circuitry can execute a USB state machine during the capabilities state to establish a USB connection with a second USB device associated with the first CCTU, wherein the USB state machine may transition through a plurality of USB states in response to signals that may be received by the transducer. The circuitry can selectively drive a signal on the first pin that may be used to communicate with the second transmitter unit in response to a state transition in at least one of the CCRU state machine and the USB state machine.

The transmitter and receiver units can also resolve which USB mode to be used. For example, in one embodiment, a method for resolving a USB mode for use by a CCRU may be provided. The method can include receiving a capabilities message from a first CCTU over a contactless communications link, wherein the message may include first CCTU USB parameters, retrieving CCRU USB parameters from the CCRU, comparing the CCTU USB and CCRU USB parameters to resolve which one of a plurality of USB modes the CCRU ought to use, and selecting a USB mode based on the resolution.

As another embodiment, a method for resolving a USB mode for use by a CCTU may be provided. The method can include receiving a signal from a first CCRU via at least one wired path on at least a first pin, wherein the signal may specify one of a first CCRU USB capable parameter and a first CCRU resolved USB parameter, transmitting a CCTU USB parameter to a second CCRU over a contactless communications link, wherein the transmitted CCTU USB parameter may be based on the received signal from the first CCRU, and selecting a first USB mode based on the received signal.

FIG. 1 illustrates a communications system 100, wherein two electronic device subsystems or devices 102 and 122 may communicate with one another over at least one contactless communications link 150. Data may be transferred in at least one direction, from first device 102, which may be regarded as a "source" for sending the data to be transferred, to second device 122, which may be regarded as a "destination" for receiving the data to be transferred. With reference to FIG. 1, the transfer of data from first device 102 to second device 122 may be described. However, it should be understood that data may alternatively or additionally be transferred from second device 122 (e.g., acting as a "source" for sending the data) to first device 102 (e.g., acting as a "destination" for receiving the data), and that often information may be exchanged in both directions between devices 102 and 122 during a given communications session.

For illustrative clarity, devices 102 and 122 will be described as "mirror images" of one another, but it should be understood that the two devices 102 and 122 may be different than each other (e.g., as described below with respect to FIGS. 3-13). For example, one of the devices may be a laptop computer and the other device may be a mobile telephone or an adapter of a mobile telephone. Some examples of electronic devices which may benefit from the techniques disclosed herein may include cellular telephones (or handsets, or smart phones), computers, docks (e.g., docking stations), laptops, tablets, or comparable electronic devices, to name but a few.

First electronic device 102 may include a host system 104 and a contactless communication unit 106, which may be referred to as an "EHF contactless communication unit", a "smart" contactless connector, a "communication subsystem", a "smart connector", a "contactless connector", or simply a "connector" 106. The unit 106 associated with first device 102 may be generally capable of performing at least one of establishing and managing operation of contactless link 150 with unit 126 of second device 122, monitoring and modifying data passing through unit 106 onto link 150, and/or interfacing with and providing application support for host system 104. These functions of unit 106, with regard to interacting with link 150, the data, and host system 104, may be described and elaborated upon and discussed in greater detail hereinbelow (or elsewhere in this disclosure).

Unit 106 associated with first device 102 may include some or all of the following elements: electrical interface 108, processor 110 and associated memory 112, control circuits 114, measurement circuits 116, one or more transceivers 118, and/or one or more transducers 119. The operation of these various elements (108-119) may be described and elaborated upon and discussed in greater detail hereinbelow (or elsewhere in this disclosure).

Second electronic device 122 may include host system 124 and a contactless communication unit 126, which may be referred to as an "EHF contactless communication unit", a "smart" contactless connector, a "communication subsystem", a "smart connector", a "contactless connector", or simply a "connector" 126. Connector 126 associated with second device 122 may be generally capable of establishing and managing operation of contactless link 150 with unit 106 of first device 102, monitoring and modifying data passing though the unit 126 onto link 150, and/or interfacing with and/or providing application support for host system 124. These functions of unit 126, with regard to interacting with link 150, the data, and the host system 124, may be described and elaborated upon and discussed in greater detail hereinbelow (or elsewhere in this disclosure).

Unit 126 associated with second device 122 may include some or all of the following elements: an electrical interface 128, processor 130 and associated memory 132, control circuits 134, measurement circuits 136, one or more transceivers 138, and/or one or more transducers 139. The operation of these various elements (128-139) may be described and elaborated upon and discussed in greater detail hereinbelow (or elsewhere in this disclosure).

Units 106 and 126 may operate without intervention from host processors (e.g., processors of host systems 104 and 124, respectively), and/or may take control of the host systems 104 and 124, respectively, or portions thereof. Units 106 and 126 may open/activate applications, return status/power levels, connection parameters, data types, information on devices/systems that are connected, content information, amount and type of data being transferred, including device configuration based on connection type, link management, quota information, channel control, and the like.

The dashed-line rectangles shown (e.g., in FIG. 1) around units 106 and 126 may simply represent "partitioning" of functions, separating (e.g., distinguishing) units 106 and 126 from host system 104 and 124, respectively. The antennae shown (e.g., symbolically as transducers 119 and 139) outside of the dashed-line rectangles may be considered to be within the functional blocks of units 106 and 126, but may be disposed either internal or external to a communications chip constituting the contactless connector (e.g., for receiving EHF contactless signals from another antennae/transducer (e.g., across link 150)). The dashed-line rectangles shown (e.g., in FIG. 1) around units 106 and 126 may also represent non-conducting barriers (e.g., housings, enclosures, or the like, not shown), such as of plastic or acrylic enclosing units 106 and 126 or could also include entire devices 102 and 122, respectively, as described hereinabove.

Electrical interfaces 108 and 128 may include communications port(s)/channel(s) to communicate with any suitable portion(s) of host systems 104 and 124, respectively. Host systems 104 and 124 may have their own processors and associated circuitry (e.g., as described below with respect to FIGS. 3-13 but not shown in FIG. 1). As mentioned, devices 102 and 122 may be described as "mirror images" of one another, but it should be understood that the two devices 102 and 122, and/or the two host systems 104 and 124, may be different than each other. For example, one of the devices or host systems may be a laptop computer, the other device or host system may be a mobile telephone or an adapter for a mobile telephone. Some examples of electronic devices which may benefit from the techniques disclosed herein may include cellular telephones (or handsets, or smart phones), computers, docks (e.g., docking stations), laptops, tablets, or comparable electronic devices, to name but a few.

Processors 110 and 130 may be embedded microprocessors, or microcontrollers, or state machines, may run management operating systems (OSs) for the connection, and/or may have built-in authentication/encryption engines. Processors 110 and 130, either alone or in combination with other elements presented herein, may be operative to manage the communications link, to monitor data passing through the units and over the communications link, and/or to provide application support for a host system, or to execute one or more state machines, or variations thereof as may become evident from the several functional descriptions set forth herein. In a broader sense, units 106 and 126 may be capable of performing one of more of (at least one of) the various functions described herein.

Memory 112 and 132 may be any suitable memory, such as random access memory (RAM), non-volatile RAM (NVRAM, such as flash memory), or the like, and may include registers containing configuration, status, permissions, content permissions, keys for authentication/encryption, application(s) (e.g., software and/or firmware for use by processor 110 and 130), and the like.

Control circuits 114 and 134 may include any suitable circuitry that may be capable of monitoring the state of the link and/or actively appending to or changing data concurrently ("on-the-fly") as it goes through unit 106 or 126, respectively.

Measurement circuits 116 and 136 may include any suitable circuitry that may be capable of observing (e.g., monitoring) the connection state/status, the connection type, and/or the data being transmitted. Sensors (not shown) may be included to monitor signal strength, ambient environmental conditions, and the like. Signal-to-noise ratio can be used as an indicator of signal quality.

Transceivers 118 and 138 may include any transceivers (and associated transducers or antennas 119 and 139) that may be suitable for converting between electrical signals (e.g., for the host system) and EM signals (e.g., for the contactless communications link). Transceivers 118 and 138 may each be a half-duplex transceiver that can asynchronously convert a baseband signal into a modulated EHF (extremely high frequency) carrier at 30-300 GHz, or higher, such as 60 GHz carrier frequency, which may be radiated from an internal or external antenna (e.g., as shown schematically), or can receive and demodulate the carrier and reproduce the original baseband signal. The EHF carrier may penetrate a wide variety of commonly-used non-conductive materials (e.g., glass, plastic, etc.).

It should be understood that if only one-way communication is required, such as from first device 102 to second device 122, transceiver 118 could be replaced by a Tx and transceiver 138 could be replaced by a Rx.

Transmit power and receive sensitivity for transceivers 118 and 138 may be controlled to minimize electromagnetic interference (EMI) effects and/or to simplify FCC certification, if appropriate.

Transceivers 118 and 138 may be implemented as IC chips comprising a Tx, a Rx, and related components. Transceiver chip(s) may be packaged in a conventional manner, such as in ball grid array (BGA) format. The antenna may be integrated into the package, or may be external to the package, or may be incorporated onto the chip itself. An exemplary unit 106, 126 may include one, two, or more transceiver chips. Some features or characteristics of transceivers 118 and 138 may include low latency signal path, multi-gigabit data rates, link detection, and/or link training. The signals transmitted by transceivers 118 and 138 may be modulated in any suitable manner to convey the data being transferred from one device to the other device, some non-limiting examples of which are presented herein. Modulation may be OOK (on/off keying), ASK, PSK, QPSK, QAM, or other suitable modulation techniques. Signals may be encoded and packetized and transmitted by one transceiver (e.g., transceiver 118), and received and unpacketized and decoded by another transceiver (e.g., transceiver 138). Out-of-band (OOB) signaling or other suitable techniques may be used to convey information other than or related to the data being transferred between the two devices.

Transceivers 118 and 138, or individual transmitters and receivers, which may be implemented as chips, may be factory-serialized, so that the chips and their transmissions may be 'tagged' (e.g., fingerprinted), which may enable a later forensic analysis to be performed for digital rights management (DRM). For example, protected (e.g., premium) content could be freely (e.g., unimpededly) transferred from one device to another, but the transaction could be traced to the specific devices involved, so that the participants in the transaction can be held accountable (e.g., billed). Premium protected content may be modified, data appended thereto, and/or can be logged with chip ID, user ID, or by other means.

Communications link 150 may be a "contactless" link, and the first and second units 106 and 126 may be "contactless" connectors, as described herein. Differences between units 106 and 126 disclosed herein and conventional mechanical connectors may be immediately apparent, and may be described herein. The units may be considered to be communication subsystems of a host device. In this regard, differences between the contactless connectors 106 and 126 disclosed herein and controllers such as Ethernet (Standard) controllers may not be immediately apparent in that both may handle data flow between a host system and a communications link. However, a distinction between the contactless connectors disclosed herein and exemplary Standards controllers may be that the contactless connectors disclosed herein may both set up the contactless communications link and transfer data from a host system directly onto the contactless communications link, without the intermediary, for example, of mechanical (e.g., electrical, not RF) connectors and a cable. Further distinctions may be made in the way that the contactless connectors disclosed herein may be capable of operating independently and/or transparently from the host system, without requiring host awareness or interaction.

Data transfer between electronic devices 102 and 122 may be implemented over a "contactless" RF EM communications link (interface) 150, which may be handled substantially entirely by the units 106 and 126 of first and second devices 102 and 122, respectively. Signals flowing between units 106 and 126 of devices 102 and 122 may occur electromagnetically over a non-electrical (e.g., dielectric) medium, such as an air gap, waveguide, plastics (e.g., polyethylene, thermoplastic polymers, polyvinylidene difluoride, fluoropolymers, ABS, and other plastics), including combinations of these materials. The EHF signal can pass through other dielectric materials such as cardboard. The EHF signal can pass through a series of different dielectric materials and/or waveguides.

Due to the high data rate enabled by the EHF contactless communication, large data files, such as movies, audio, device images, operating systems, and the like may be transferred in very short periods of time in contrast with existing technologies such as NFC. As an example, a 1 Gigabyte data file may be transferred in as little as 2 seconds. The electromagnetic communication may typically be over an air gap that may be limited to a short range, such as 0-5 cm. A dielectric medium, such as a dielectric coupler, may be used to extend the range of the contactless link between the devices 102 and 122 to several centimeters (cm), meters, or more.

The communications link may include a dielectric medium that may include any suitable materials, such as an air gap, a waveguide, plastics, or a combination thereof. Alternatively, the communications link may be enabled by a slot antenna in a conductive medium, where the slot antenna may direct the contactless connectivity in a desired direction. A device (e.g., at least the contactless connector) may be substantially fully enclosed by a conductive medium other than at a location where it may be desired to emit and/or receive EHF radiation from a partner device (e.g., at least the contactless connector thereof), which may also be similarly substantially fully enclosed by a conductive medium.

It should be understood that in this, and any other embodiments of contactless links discussed herein, an overall communications system may be implemented as a combination of contactless and physical links. Furthermore, some of the techniques described herein may be applied to transferring data over a physical link. In such a link the transceiver can contactlessly transmit data to a cable that may serve as a physical conduit for the data.

One or both of devices 102 and 122 may have two or more transceivers. Having two or more transceivers may support a feedback loop, latency, changes, full duplex operation, and/or may simultaneously establish a second communications link (e.g., for communicating with the host system). An exemplary "data flow" may proceed as follows. Data originating from host system 104 or data originating at unit 106 may be provided by unit 106, via its transceiver 118 and transducer 119, onto the communications link 150. The data may pass through or over communications link 150. Data received from the communications link 150 by transducer 139 and transceiver 138 of unit 126 may be provided to host system 124 or may remain with unit 126. Data may flow in the reverse direction, from host system 124 via unit 126 or originating at unit 126 onto the contactless link 150 to unit 106 which may pass the data to host system 104. Although not shown, each one of units 106 and 126 may include one or more suitable busses for communicating data and/or power between various components 108-119 and/or between various components 128-139.

Figure 2:
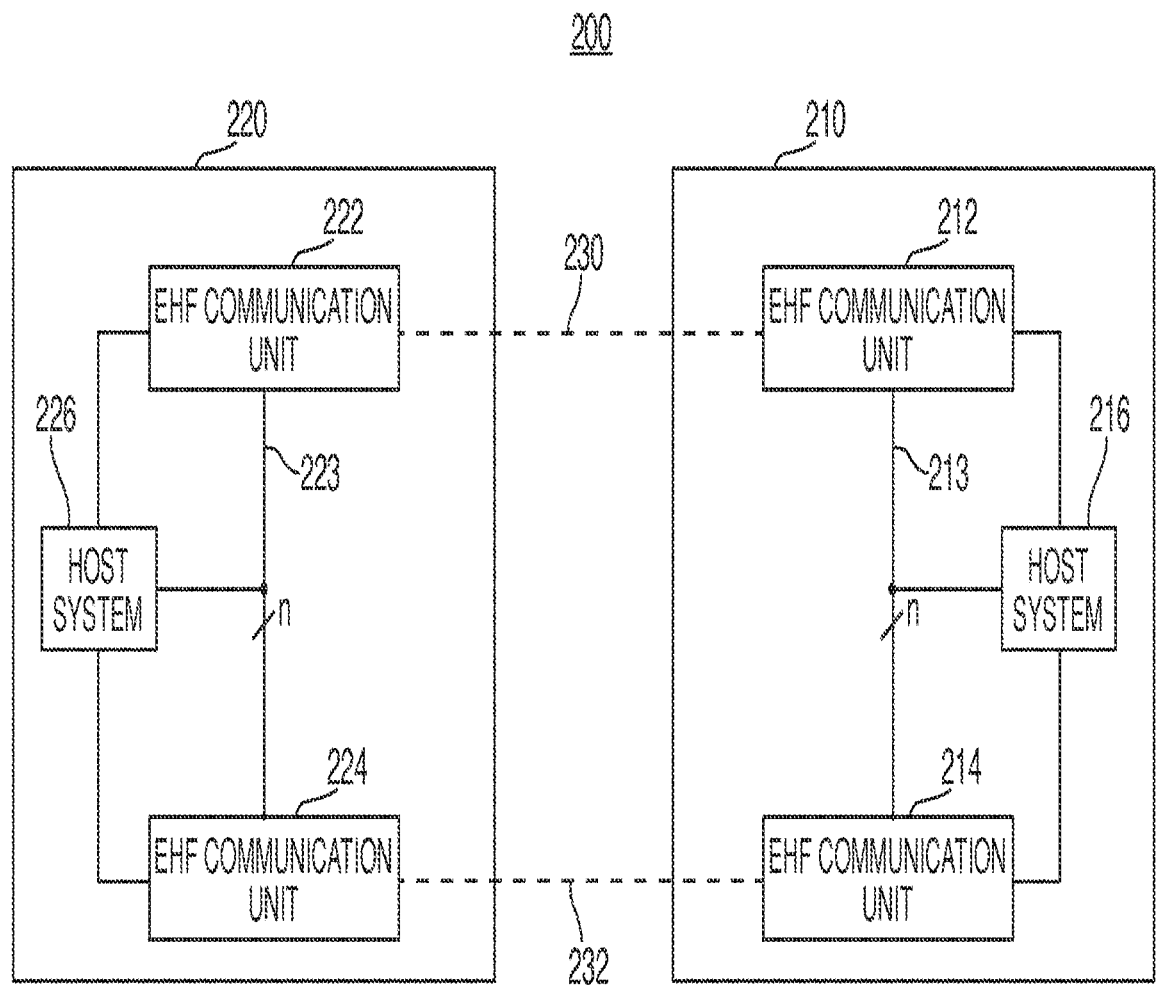
FIG. 2 illustrates a communications system in which two electronic devices may communicate with one another over two or more contactless communications links, according to an embodiment.

FIG. 2 illustrates a communications system 200 wherein two electronic device subsystems or devices 210 and 220 may communicate with one another over two or more contactless communications links, according to an embodiment. System 200 may be similar to system 100 in many respects, but for illustrative and simplified discussion purposes, shows that each device may include two EHF communication units. Moreover, any EHF communication unit in system 200 may be the same or substantially the same as any EHF communication unit in system 100. As such, a more simplified representation of units 106 and 126 are shown in FIG. 2. If desired, each device can include three, four, five, or more EHF communication units. First device 210 may include EHF communication unit 212, EHF communication unit 214, and host system 216. One or more wired paths 213 may directly connect EHF communication units 212 and 214 together. Host system 216 may communicate with EHF communication units 212 and 214. In some embodiments, EHF communication units 212 and 214 may communicate with each other through host system 216. In other embodiments, host system 216 may be able to drive a signal on at least one of wired paths 213. Similarly, second device 220 may include EHF communication unit 222, EHF communication unit 224, and host system 226. One or more wired paths 223 may directly connect EHF communication units 222 and 224 together. Host system 226 may communicate with EHF communication units 222 and 224. In some embodiments, EHF communication units 222 and 224 may communicate with each other through host system 226. In other embodiments, host system 226 may be able to drive a signal on at least one of wired paths 223. Host systems 216 and 226 may be similar to host systems 104 and 124, both of which include circuitry specific to their respective subsystems or devices and may thereby enable subsystems or devices 210 and 220 to operate for their intended functionality.

In some embodiments, each of EHF communication units 212, 214, 222, and 224 can be the same as EHF communication unit 106 or 126, discussed above. As such, EHF communication units 212, 214, 222, and 224 may include transceivers (e.g., CCXUs) that may be capable of being configured to transmit and/or receive EHF signals. For example, in one approach, units 212 and 224 can be configured to receive EHF signals (e.g., as CCRUs) and units 214 and 222 can be configured to transmit EHF signals (e.g., as CCTUs). Thus, in this approach, a contactless communications link 230 may exist between EHF communication units 222 and 212, and a contactless communications link 232 may exist between EHF communication units 214 and 224. As shown, units 212 and 222 may work together as a coupled pair of units that may communicate via link 230, and units 214 and 224 may work together as another coupled pair of units that may communicate via link 232. If one or more additional coupled pairs of units were to be included in system 200, then additional communications links would also exist.

After the units progress through their respective state machines and establish the links, and data no longer needs to be communicated across the links, the units can enter in a power savings mode state or data transport idle state depending on whether they are being implemented as a transmitter or receiver unit. The power savings state may enable an EHF communication unit to power down selective circuitry, after the EHF communication link has been established, when there may be no data to be communicated over the link. The transmitter unit may transmit a "keep alive" signal to the receiver unit to prevent it from timing out and exiting out of its power savings mode. The receiver unit may be periodically turned on to monitor whether the transmitter is sending the "keep alive" signal. The transmitter and receiver units may transition to a new state (e.g., a data transport state) when they receive instructions to do so. As a specific example, an apparatus can include an EHF transceiver and control circuitry. The control circuitry may be operative to control establishment of an EHF communications link with another apparatus by executing a state machine that may transition from state to state in response to satisfaction of any one of a plurality of conditions, establish the EHF communication link with the apparatus to selectively enable one of transmission and reception of data, after the EHF communication link with the apparatus may be established, monitor an absence of data being communicated over the EHF communication link, and enter into a power savings state in response to the monitored absence of data being communicated over the EHF communication link until the state machine transitions to a new state.

Both devices 210 and 220 have the ability to control activation and deactivation of the links existing between the two devices. For example, if the links are in a power savings mode, and device 210 decides it wishes to transmit data to device 220, device 210 may change a signal state on one of the pins of one of its EHF units to bring it out of sleep and into an active data transport ready state. In response to the change in signal state, it may transmit a signal over the contactless communications link to its counterpart EHF unit, which may exit out of its power state and enter into an active data transport state. In addition, the counterpart EHF unit may inform other circuitry within device 220 that incoming data traffic is about to commence and that any appropriate changes are put into effect so that the data can be handled properly. For example, in the context of various embodiments described herein, when the counterpart EHF unit is contained in an adapter device that is electrically coupled to a user device, the counterpart EHF unit may provide a signal that causes adapter circuitry to turn off an active connection coupling a memory to the user device and activate a connection coupling the memory to the EHF unit.

Two different electronic devices may be equipped with two different data transfer mechanisms and/or may be configured to communicate with other devices using two different interface protocols or standards, thereby making the two devices incompatible for data communication. For example, a first device may be operative to communicate with other devices over a mechanical communications link using a mechanical connector while a second device may be operative to communicate with other devices over a contactless communications link using a contactless connector. Additionally or alternatively, a first device may only be compatible with USB 2.0 communication protocols while a second device may support only USB SuperSpeed communication protocols but not legacy USB 2.0 protocols. Therefore, in order to enable data transfer between two such electronic devices, an adapter can be provided that may be operative to facilitate easy and swift data transfer amongst previously incompatible electronic devices. Such an adapter may be operative to communicate data with a first of the two electronic devices using a first type of communications link and a first communication protocol and to communicate data with a second of the two electronic devices using a second type of communications link that is different than the first type of communications link and/or using a second communication protocol that is different than the first communication protocol, such that data may be transferred between the first and second electronic devices via the adapter. The adapter may be operative to be communicatively coupled to both the first electronic device and the second electronic device at the same time. Additionally or alternatively, the adapter may be operative to rapidly transition between communicating data with the first device and communicating data with the second device (e.g., without altering a physical connection between the adapter and one of the first and second devices).

One or more contactless EHF communication units may be provided by the adapter to communicate data according to one or more particular protocols between the adapter and at least one of the two electronic devices. For example, a first one of the electronic devices may be a device that may only support cabled transfers and the second one of the electronic devices may be enabled with a contactless EHF communication unit, while the adapter may be compatible with both devices and may be used to facilitate data transfer between the first and second devices by using a wired data transfer link between the first device and the adapter and by using a contactless EHF data transfer link between the adapter and the second device. An output may be provided by an EHF communication unit of the adapter that may be leveraged to control a switch of the adapter to dictate what communication path(s) of the adapter may be active (e.g., a data transfer path between the first device and the adapter, a data transfer path between the second device and the adapter, and/or a data transfer path between the first device and the second device via the adapter, etc.).

In some embodiments, the functionality of the adapter may be built in to or otherwise integrated into the structure or circuitry of one of the electronic devices. In other embodiments, the adapter may be provided as a distinct and/or standalone device that may be removably coupled to one of the electronic devices (e.g., as a removable card or protective sleeve or dongle). Such an adapter may also be configured to provide additional functionality, other than data transfer compatibility, to at least one of the two electronic devices, such as to provide memory and/or power and/or image capture functionality or the like. For example, the adapter may also function as additional storage, whether the adapter is built into the first device or removably coupled to the first device. Extra storage may be useful in situations where a user either desires a partitioned storage with different security/encryption features and/or wants an external/removable storage device with or without different security/encryption features from that of memory local to the first device. Different security measures that may be provided by such memory of an adapter may be encryption-based, determinative of whether or not a remote device or network may access the memory, determinative of which regions or functions of the adapter may be accessible by one or both devices, or any other suitable measures. The adapter may provide security functions such as virus detection or authentication to prevent the passing of unsigned or vulnerable data between two devices. In some embodiments, when the adapter includes memory, data transferred from a first device to the adapter may be stored in the memory of the adapter until that data may be transferred from the adapter to the second device. The adapter may facilitate communication of message passing between two incompatible devices.

Figure 3:
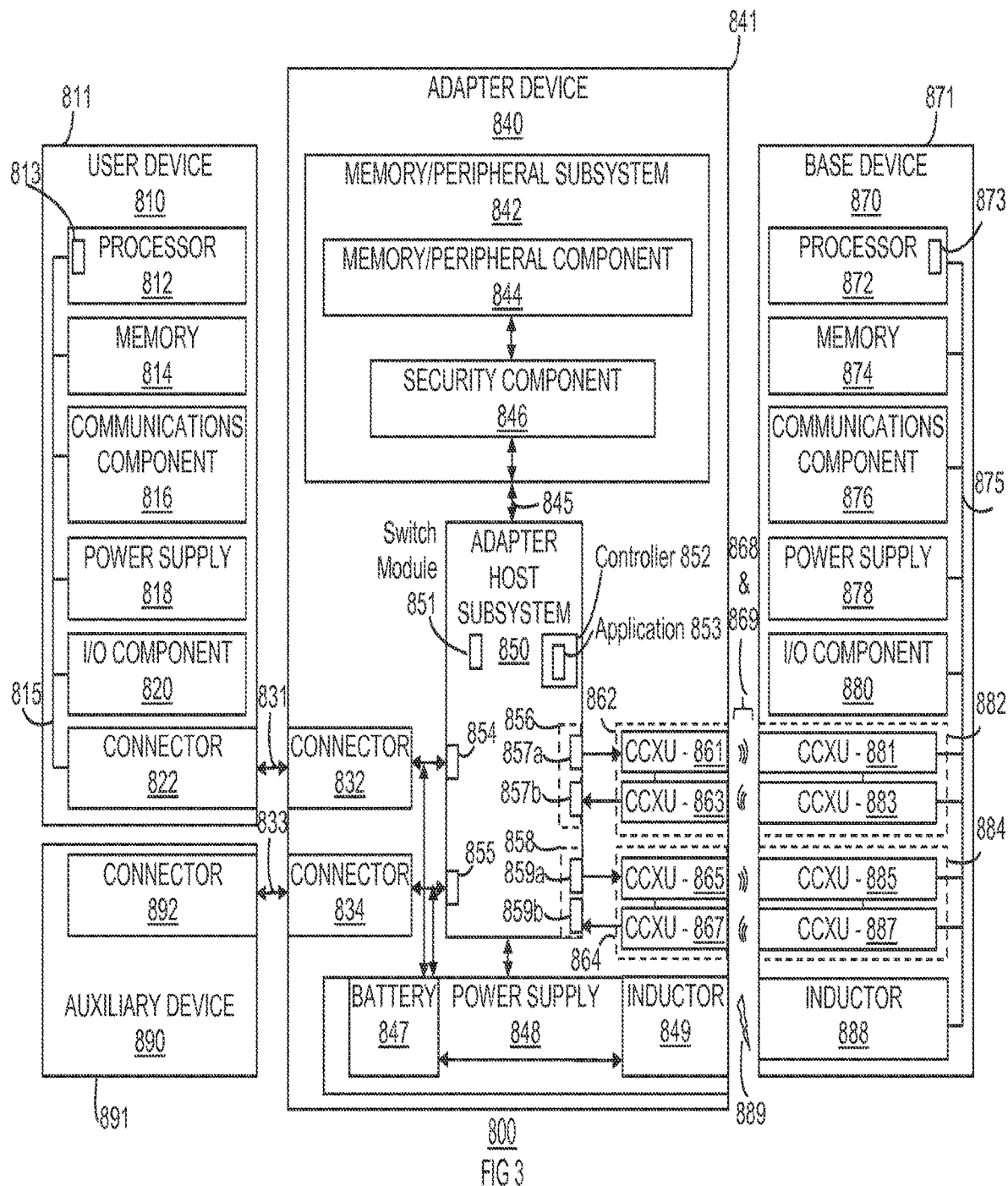
FIG. 3 is yet another illustrative system in which at least two electronic devices may communicate with one another over at least one contactless communication link, according to an embodiment.

As shown in FIG. 3, for example, a communications system 800 may include a first electronic device subsystem or first electronic device or user device 810, a second electronic device subsystem or second electronic device or base device 870, and a converter device or compatibility device or adapter device 840 that may be operative to enable transfer of data between user device 810 and base device 870, where devices 810 and 870 may not have compatible standard protocols or transfer mechanisms. System 800 may also include an auxiliary electronic device subsystem or auxiliary electronic device or auxiliary device 890 that may be operative to communicate data with at least one of adapter device 840 and/or user device 810 (e.g., directly or via adapter device 840) and/or base device 890 (e.g., directly or via adapter device 840).

User device 810 may be any suitable device or subsystem that may include one or more of a processor 812, memory 814, a communications component 816, a power supply 818, an input component and/or an output component (I/O component) 820, and/or a user device connector 822. User device 810 may also include a bus 815 that may provide one or more wired or wireless communication links or paths for transferring data and/or power to, from, or between various other components of device 810. User device 810 may also be provided with a housing 811 that may at least partially enclose one or more of the components of device 810 for protection from debris and other degrading forces external to device 810. In some embodiments, one or more components of user device 810 may be combined or omitted. Moreover, user device 810 may include other components not combined or included in FIG. 3. For example, user device 810 may include any other suitable components or several instances of the components shown in FIG. 3. For the sake of simplicity, only one of each of the components of user device 810 is shown in FIG. 3.

Memory 814 may include one or more storage mediums, including for example, a hard-drive, flash memory, permanent memory such as read-only memory (ROM), semipermanent memory such as RAM, any other suitable type of storage component, or any combination thereof. Memory 814 may include cache memory, which may be one or more different types of memory used for temporarily storing data for electronic device applications. Memory 814 may be fixedly embedded within electronic device 100 or may be incorporated on one or more suitable types of cards that may be repeatedly inserted into and removed from user device 810 (e.g., a subscriber identity module (SIM) card or secure digital (SD) memory card).

Power supply 818 can include any suitable circuitry for receiving and/or generating power, and for providing such power to one or more of the other components of user device 810. For example, power supply 818 can be coupled to a power grid (e.g., when device 810 is not acting as a portable device or when a battery of the device is being charged at an electrical outlet with power generated by an electrical power plant). As another example, power supply 818 can be configured to generate power from a natural source (e.g., solar power using solar cells). As another example, power supply 818 can include one or more batteries for providing power (e.g., when device 810 is acting as a portable device).

One or more input components of I/O component 820 may be provided to permit a user to interact or interface with user device 810. For example, such an input component of user device 810 can take a variety of forms, including, but not limited to, a touch pad, touch screen, one or more buttons (e.g., a keyboard), mouse, microphone, camera, scanner, proximity sensor, light detector, motion sensor, biometric sensor, and combinations thereof. Each input component can be configured to provide one or more dedicated control functions for making selections or issuing commands associated with operating user device 810. One or more output components of I/O component 820 may be provided to present information (e.g., graphical, audible, olfactory, and/or tactile information) to a user of user device 810. For example, such an output component of user device 810 may take various forms, including, but not limited to, audio speakers, visual displays, haptic output components, or combinations thereof. It should be noted that one or more input components and one or more output components may sometimes be referred to collectively herein as a single I/O component or I/O interface, such as a touch screen, that may receive input information through a user's touch of a display screen and that may also provide visual information to a user via that same display screen. As described below in more detail, such user interface capabilities (e.g., in accordance with any suitable application 813/853/873 (e.g., a data synching application) available for user device 810) may enable a user to interact with user device 810 in any suitable way for at least partially defining when or what type of data transfer may be enabled between user device 810 and adapter device 840 and/or between adapter device 840 and base device 870 (e.g., user instructions received at user device 810 may be shared with adapter device 840 for use in dictating data transfer between adapter device 840 and base device 870).

Processor 812 of user device 810 may include any processing circuitry that may be operative to control the operations and performance of one or more components of user device 810. For example, processor 812 may receive input signals from an input component of I/O component 820 and/or from any other suitable component of user device 810 (e.g., user device connector 822), and/or may drive output signals through an output component of I/O component 820 and/or through any other suitable component of user device 810 (e.g., user device connector 822). As shown in FIG. 3, processor 812 may be used to run one or more applications, such as a user device application 813. As one example, application 813 may be an operating system application and/or a third party application or other specific application (e.g., an application associated with adapter device 840 for enabling various features for syncing data between user device 810 and adapter device 840 and/or base device 870). For example, processor 812 may load application 813 as a user interface program to determine how instructions or data received via an input component or other component of device 810 may manipulate the way in which information may be stored and/or provided to the user or another device via an output component or other suitable component of device 810. Application 813 may be accessed by processor 812 from any suitable source, such as from memory 814 (e.g., via bus 815) or from another device (e.g., adapter device 840 and/or base device 870) or a remote server. For example, an application 813 may be a computer-program product that may be stored in a tangible computer-readable memory, such as any suitable non-transitory storage drive or any other suitable computer-readable medium accessible to user device 810. Memory 814 may be an example of tangible computer-readable media that may be configured to store data such as computer-program product embodiments, including executable computer code, human-readable code, or the like. As mentioned, memory 814 may include any suitable memory, such as a floppy disk, removable hard disk, optical storage media, CD-ROM, DVD, bar code, semiconductor memories such as flash memory, ROM, RAM, battery-backed volatile memory, networked storage device, and the like. Memory 814 may store and/or processor 812 may access any suitable programming and data constructs that may provide at least a portion of the functionality of various embodiments of this disclosure. Processor 812 may include a single processor or multiple processors. For example, processor 812 may include at least one "general purpose" microprocessor, a combination of general and special purpose microprocessors, instruction set processors, graphics processors, video processors, and/or related chips sets, and/or special purpose microprocessors. Processor 812 also may include on board memory for caching purposes.

Communications component 816 may be provided to allow user device 810 to communicate with one or more other devices or servers or subsystems (e.g., one or more subsystems devices of system 800, such as adapter 840) using any suitable communications protocol. For example, communications component 816 may support Wi-Fi (e.g., an 802.11 protocol), ZigBee (e.g., an 802.15.4 protocol), WiDi™, Ethernet, Bluetooth™ Bluetooth™ Low Energy (BLE), high frequency systems (e.g., 900 MHz, 2.4 GHz, and 5.6 GHz communication systems), infrared, transmission control protocol/internet protocol (TCP/IP) (e.g., any of the protocols used in each of the TCP/IP layers), Stream Control Transmission Protocol (SCTP), Dynamic Host Configuration Protocol (DHCP), hypertext transfer protocol (HTTP), BitTorrent™, file transfer protocol (FTP), real-time transport protocol (RTP), real-time streaming protocol (RTSP), real-time control protocol (RTCP), Remote Audio Output Protocol (RAOP), Real Data Transport Protocol™ (RDTP), User Datagram Protocol (UDP), secure shell protocol ("SSH"), wireless distribution system (WDS) bridging, any communications protocol that may be used by wireless and cellular telephones and personal e-mail devices (e.g., Global System for Mobile Communications (GSM), GSM plus Enhanced Data rates for GSM Evolution (EDGE), Code Division Multiple Access (CDMA), Orthogonal Frequency-Division Multiple Access ("OFDMA"), high speed packet access (HSPA), multi-band, etc.), any communications protocol that may be used by a low power Wireless Personal Area Network (6LoWPAN) module, USB (e.g., USB 2.0, USB 3.0, USB 3.1, USB Type C, USB 3/2, or USB OTG, with SuperSpeed or SuperSpeed+ transfer modes), DP, Apple Thunderbolt or Lightning, HDMI, SATA/SAS, PCIe, Ethernet SGMII, Hypertransport, Quickpath, I2S, GPIO, I2C, any extensions or revisions thereof, any other communications protocol, or any combination thereof. Communications component 816 may also include or be electrically coupled (e.g., via bus 815) to any suitable user device connector 822 (e.g., any suitable wireless antenna or contactless connector or mechanical connector and/or electro-mechanical connector) that can enable user device 810 to be communicatively coupled to another device (e.g., adapter device 840 or auxiliary device 890) for transferring data with that other device wirelessly or via a wired connection according to a communication protocol of communications component 816. Communications component 816 may be any suitable hardware, software, firmware, or combination thereof that may enable user device 810 to communicate data via user device connector 822 to another device using a particular communications protocol.

User device 810 may also be provided with a housing 811 that may at least partially enclose one or more of the components of device 810 for protection from debris and other degrading forces external to device 810. In some embodiments, one or more of the components may be provided within its own housing (e.g., an input component of I/O component 820 may be an independent keyboard or mouse within its own housing that may wirelessly or through a wire communicate with processor 812, which may be provided within its own housing).

Base device 870 may be any suitable electronic device subsystem or electronic device that may include one or more of a processor 872 with access to a base device application 873, memory 874, a communications component 876, a power supply 878, an input component and/or an output component (I/O component) 880, a base device connector 882, and a supplemental base device connector 884. Base device 870 may also include a bus 875 that may provide one or more wired or wireless communication links or paths for transferring data and/or power to, from, or between various other components of device 870. Power supply 878 may include or be coupled (e.g., via bus 875) to an inductor 888, as described below. Base device 870 may also be provided with a housing 871 that may at least partially enclose one or more of the components of device 870 for protection from debris and other degrading forces external to device 870. In some embodiments, one or more components of base device 870 may be combined or omitted. Moreover, base device 870 may include other components not combined or included in FIG. 3. For example, base device 870 may include any other suitable components or several instances of the components shown in FIG. 3. For the sake of simplicity, only one of each of the components of base device 870 is shown in FIG. 3. Unless otherwise noted, each one of housing 871, processor 872, application 873, memory 874, bus 875, communications component 876, power supply 878, I/O component 880, connector 882 and/or supplemental connector 884 of base device 870 may be the same as or substantially similar to a respective one of housing 811, processor 812, application 813, memory 814, bus 815, communications component 816, power supply 818, I/O component 820, and connector 822 of user device 810, and, therefore, may not be independently described in greater detail. Similarly, auxiliary device 890 may be any suitable electronic device subsystem or electronic device that may include any suitable components, such as one or more of a housing 891, processor (not shown), application (not shown), memory (not shown), bus (not shown), communications component (not shown), power supply (not shown), I/O component (not shown), and/or auxiliary device connector 892 that, unless otherwise noted, may be the same as or substantially similar to a respective one of housing 811, processor 812, application 813, memory 814, bus 815, communications component 816, power supply 818, I/O component 820, and connector 822 of user device 810, and, therefore, may not be independently described in greater detail.

Adapter device 840 may be any suitable device or subsystem that may include one or more of a memory (e.g., peripheral) subsystem 842, an adapter host subsystem 850, a power supply 848, and/or one or more adapter connectors, including, for example, a user device-adapter connector 832, an auxiliary device-adapter connector 834, a base device-adapter connector 862, and a supplemental base device-adapter connector 864. Memory subsystem 842 may include at least one peripheral or memory component 844 and at least one security component 846. Power supply 848 may include at least one battery 847 and/or at least one inductor 849. Adapter host subsystem 850 may include one or more of a switch module 851, a controller 852, an application 853, and/or one or more interfaces (e.g., electrical interfaces), including, for example, a user device-adapter connector interface 854, an auxiliary device-adapter connector interface 855, a base device-adapter connector interface 856, and a supplemental base device-adapter connector interface 858. Each one of adapter connector interfaces 854, 855, 856, and 858 may include one or more communications port(s)/channel(s) to communicate with any suitable portion(s) of respective device-adapter connectors 832, 834, 862, and 864. Adapter device 840 may also include a bus 845 that may provide one or more wired or wireless communication links or paths for transferring data and/or power to, from, or between various other components of device 840 (e.g., including amongst the various components of adapter host subsystem 850 (not shown for the sake of clarity of FIG. 3)). Adapter device 840 may also be provided with a housing 841 that may at least partially enclose one or more of the components of device 840 for protection from debris and other degrading forces external to device 840. In some embodiments, one or more components of adapter device 840 may be combined or omitted. Moreover, adapter device 840 may include other components not combined or included in FIG. 3. For example, adapter device 840 may include any other suitable components or several instances of the components shown in FIG. 3. For the sake of simplicity, only one of each of the components of adapter device 840 is shown in FIG. 3.

Controller 852 of adapter host subsystem 850 of adapter device 840 may include any processing or control circuitry that may be operative to control the operations and performance of one or more components of adapter device 840. For example, controller 852 may receive input signals from any other suitable component of adapter device 840 (e.g., from any suitable adapter connector interface 854-858 or from peripheral subsystem 842) and/or may drive output signals through or to any suitable component of adapter device 840 (e.g., through any suitable adapter connector interface 854-858 or to peripheral subsystem 842). As shown in FIG. 3, controller 852 may be used to run one or more applications, such as an adapter device application 853. As one example, application 853 may be an operating system application and/or a third party application or other specific application (e.g., an application associated with user device 810 and/or base device 870 for enabling various features for syncing data between adapter device 840 and user device 810 and/or base device 870). For example, controller 852 may load application 853 as a program to determine how instructions or data received via a component of device 840 may manipulate the way in which information may be stored on adapter device 840, transmitted from adapter device 840, and/or received by adapter device 840. Application 853 may be accessed by controller 852 from any suitable source, such as from a memory of adapter system 840 (e.g., from a memory of peripheral subsystem 842 (e.g., a memory peripheral component 844) or from a memory local to adapter host subsystem 850 (not shown) (e.g., via bus 845)) or from another device (e.g., user device 810 and/or base device 870) or from a remote server (not shown). For example, an application 853 may be a computer-program product that may be stored in a tangible computer-readable memory, such as any suitable non-transitory storage drive or any other suitable computer-readable medium accessible to adapter device 840.

Such memory may be an example of tangible computer-readable media that may be configured to store data such as computer-program product embodiments, including executable computer code, human-readable code, or the like. Like memory 814 mentioned above with respect to application 813, such memory may include any suitable memory, such as a floppy disk, removable hard disk, optical storage media, CD-ROM, DVD, bar code, semiconductor memories such as flash memory, ROM, RAM, battery-backed volatile memory, networked storage device, and the like. Such memory may store and/or controller 852 may access any suitable programming and data constructs that may provide at least a portion of the functionality of various embodiments of this disclosure. Controller 852 may include a single processor or multiple processors. Controller 852 may include on board memory for caching purposes. An adapter device application 853 may include one or more native application programming interfaces (APIs) for one or more communication protocols that may be utilized by controller 852 to properly receive data transferred to adapter 840 according to a particular protocol and/or that may be utilized by controller 852 to properly transmit data from adapter 840 according to a particular protocol. For example, controller 852 may leverage a USB 2.0 native API of application 853 for properly receiving data transferred to adapter 840 according to a USB 2.0 communications protocol from user device 810 via user device-adapter connector 832 and user device-adapter connector interface 854, and/or controller 852 may leverage a USB 3.0 native API of application 853 for properly receiving data transferred to adapter 840 according to a USB 3.0 communications protocol from base device 870 via base device-adapter connector 862 and base device-adapter connector interface 856. As another example, controller 852 may leverage a USB 2.0 native API of application 853 for properly transmitting data from adapter 840 (e.g., from peripheral subsystem 842) to user device 810 according to a USB 2.0 communications protocol via user device-adapter connector interface 854 and user device-adapter connector 832, and/or controller 852 may leverage a USB 3.0 native API of application 853 for properly transmitting data from adapter 840 (e.g., from peripheral subsystem 842) to base device 870 according to a USB 3.0 communications protocol via base device-adapter connector interface 856 and base device-adapter connector 862. As mentioned, it is to be understood that an EHF contactless communication unit may be compatible with any standard including its own standard specification or any other specification, meaning it may not be limited to transferring between existing standard protocols. Adapter device application 853 may include one or more native application programming interfaces for any such protocol that may be utilized by EHF contactless communication units.

Data received by adapter device 840 (e.g., data as communicated from user device 810 and/or from base device 870) may be passed by controller 852 (e.g., when using an appropriate communications protocol API associated with the communications protocol with which the received data was communicated) to peripheral subsystem 842 for any suitable appropriate use by adapter 840. For example, peripheral subsystem 842 may include any suitable peripheral component 844 that may be operative to receive the data passed on by controller 852 for use by that peripheral component. In some embodiments, peripheral component 844 may be local adapter device memory at which the data received and passed on by controller 852 may be stored. Additionally or alternatively, peripheral component 844 may be any other suitable component such as a camera or media player that may use the data received and passed on by controller 852 (e.g., as instructions for operating the camera of the adapter and/or media to be played by the media player of the adapter). Additionally or alternatively, data transmitted by adapter device 840 (e.g., data to be communicated to user device 810 and/or to base device 870) may be passed by controller 852 (e.g., when using an appropriate communications protocol API associated with the communications protocol with which the data is to be transmitted) from peripheral subsystem 842 to user device 810 and/or to base device 870. For example, peripheral component 844 may be any suitable component that may be operative to provide the data to be passed on by controller 852 for transmission to user device 810 and/or to base device 870. As mentioned, in some embodiments, peripheral component 844 may be local adapter device memory at which the data to be passed on by controller 852 to user device 810 and/or base device 870 may be stored and from which that data may be provided to controller 852. Additionally or alternatively, peripheral component 844 may be any other suitable component such as a camera or any other suitable sensor or user input component that may generate the data to be passed on by controller 852 (e.g., image data captured by the camera and/or sensor data captured by any other suitable sensor and/or user input data captured by any suitable user input component). As another example, peripheral component 844 may be a power supply (e.g., power supply 848), to which power may be provided from controller 852 (e.g., power as may be received by adapter 840 from user device 810 and/or base device 870) and stored on that power supply, and/or from which stored power may be provided to controller 852 (e.g., power for transmission by adapter 840 to user device 810 and/or base device 870).

Peripheral or memory subsystem 842 may also include one or more security components 846 that may be operative to apply any suitable security feature(s) to data being provided to peripheral or memory component 844 from adapter host subsystem 850 (e.g., for secure use of such data by peripheral component 844 as received by adapter host subsystem 850 from user device 810 and/or from base device 870) and/or that may be operative to apply any suitable security feature(s) to data being provided from peripheral component 844 to adapter host subsystem 850 (e.g., for secure transmission by adapter host subsystem 850 of such data to user device 810 and/or to base device 870). Such security features may include any suitable encryption and/or decryption and/or encoding and/or decoding of such data in order to prevent the data from being used by devices or components that might not be privileged to do so (e.g., for providing data security, enforcing DRM, and the like). In some embodiments, security component 846 may enable peripheral component 844 to be isolated or otherwise protected from like components of devices that may be communicatively coupled to adapter device 840 (e.g., local adapter device memory peripheral component 844 and data thereon may be isolated from user device memory 814 and/or from base device memory 874 as a security measure until appropriate device components may be leveraged to execute security clearance for any data to be transferred between adapter 840 and user device 810 and/or between adapter 840 and base device 870 and/or between user device 810 and base device 870 via adapter 840). Security features may be operative to authenticate data itself and/or to authenticate a source or destination of data, which may increase the security, segregation, and use of data during data transfers enabled by adapter device 840. For example, security component 846 may be operative to only enable installation of firmware on adapter device 840 that was received from an appropriate source (e.g., a manufacturer of adapter device 840 and not an unknown base device 870 in communication with adapter device 840). Security clearance may be enabled by security component 846 prior to a particular data transfer (e.g., to confirm the authenticity of the source or target of the data transfer) or may be enabled by security component 846 after a particular data transfer (e.g., to analyze recently received data to confirm its authenticity prior to further use of that data).

Although user device 810 and base device 870 may be described above as including certain similar components, it should be understood that the two devices 810 and 870 may be different than each other in one or more ways. For example, user device 810 may be operative to communicate data and/or power with adapter device 840 according to at least one first communications protocol or user device communications protocol, and base device 870 may be operative to communicate data and/or power with adapter device 840 according to at least one second communications protocol or base device communications protocol, where at least one such user device communications protocol may be the same as or different than at least one such base device communications protocol. User device 810 may be operative to communicate data and/or power with adapter device 840 according to a user device communications protocol via a user device adapter communications path that may include user device communications component 816, user device connector 822, a user device-adapter communications link 831, user device-adapter connector 832, user device-adapter connector interface 854, and/or controller 852, where user device-adapter communications link 831 may be established and/or managed between user device connector 822 and user device-adapter connector 832. User device connector 822 and user device-adapter connector 832 may be a pair of any suitable connectors that may interact to create any suitable user device-adapter communications link 831 through which data and/or power may be communicated between connector 822 and connector 832. As just one example, user device connector 822 and user device-adapter connector 832 may be conventional mechanical connectors that may physically and/or mechanically mate with one another to create a physical and/or mechanical and/or electro-mechanical user device-adapter communications link 831 (e.g., connector 822 may be a male connector (e.g., a USB plug) that may physically fit within a corresponding female connector 832 (e.g., a USB receptacle), or vice versa, to create a physical and/or mechanical and/or electro-mechanical communication channel), where data and/or power may be communicated between connectors 822 and 832 using any suitable user device communications protocol that may be supported or enabled by such a physical and/or mechanical and/or electro-mechanical user device-adapter communications link 831. As another example, user device connector 822 and user device-adapter connector 832 may be conventional wireless connectors that may wirelessly communicatively couple with one another to create a wireless user device-adapter communications link 831 (e.g., connector 822 may be an antenna or transducer that may wirelessly communicatively couple with corresponding connector 832 that may also be an antenna or transducer), where data and/or power may be communicated between connectors 822 and 832 using any suitable user device communications protocol that may be supported or enabled by such a wireless user device-adapter communications link 831. As yet another example, user device connector 822 and user device-adapter connector 832 may be contactless connectors that may contactlessly communicatively couple with one another to create a contactless user device-adapter communications link 831 (e.g., connector 822 may be an EHF contactless communication unit (e.g., unit 106) that may contactlessly communicatively couple with corresponding connector 832 that may also be an EHF contactless communication unit (e.g., unit 126)), where data and/or power may be communicated between connectors 822 and 832 using any suitable user device communications protocol that may be supported or enabled by such a contactless user device-adapter communications link 831. Although not specifically illustrated as a contactless device-adapter communications link, user device-adapter communications link 831 may be any suitable type of device-adapter communications link, including a mechanical link, a wireless link, or a contactless link that may include any suitable number of CCXU link(s), which may support any suitable user device communications protocol(s).

Base device 870 may be operative to communicate data and/or power with adapter device 840 according to a base device communications protocol via a base device adapter communications path that may include base device communications component 876, base device connector 882, a base device-adapter communications link 868, base device-adapter connector 862, base device-adapter connector interface 856, and/or controller 852, where base device-adapter communications link 868 may be established and/or managed between base device connector 882 and base device-adapter connector 862. Base device connector 882 and base device-adapter connector 862 may be a pair of any suitable connectors that may interact to create any suitable base device-adapter communications link 868 through which data and/or power may be communicated between connector 882 and connector 862. As just one example, base device connector 882 and base device-adapter connector 862 may be conventional mechanical connectors that may physically and/or mechanically mate with one another to create a physical and/or mechanical and/or electro-mechanical base device-adapter communications link 868 (e.g., connector 882 may be a male connector (e.g., a USB plug) that may physically fit within a corresponding female connector 862 (e.g., a USB receptacle), or vice versa, to create a physical and/or mechanical and/or electro-mechanical communication channel), where data and/or power may be communicated between connectors 882 and 862 using any suitable base device communications protocol that may be supported or enabled by such a physical and/or mechanical and/or electro-mechanical base device-adapter communications link 868. As another example, base device connector 882 and base device-adapter connector 862 may be conventional wireless connectors that may wirelessly communicatively couple with one another to create a wireless base device-adapter communications link 868 (e.g., connector 882 may be an antenna or transducer that may wirelessly communicatively couple with corresponding connector 862 that may also be an antenna or transducer), where data and/or power may be communicated between connectors 882 and 862 using any suitable base device communications protocol that may be supported or enabled by such a wireless base device-adapter communications link 868. As yet another example, base device connector 882 and base device-adapter connector 862 may be contactless connectors that may contactlessly communicatively couple with one another to create a contactless base device-adapter communications link 868 (e.g., connector 882 may be an EHF contactless communication unit (e.g., unit 106) that may contactlessly communicatively couple with corresponding connector 862 that may also be an EHF contactless communication unit (e.g., unit 126)), where data and/or power may be communicated between connectors 882 and 862 using any suitable base device communications protocol that may be supported or enabled by such a contactless base device-adapter communications link 868. For example, as specifically shown in FIG. 3, base device connector 882 may include a first base device CCXU 881 and a second base device CCXU 883, and base device-adapter connector 862 may include a first base device-adapter CCXU 861 and a second base device-adapter CCXU 863, where CCXU 861 may contactlessly communicatively couple with CCXU 881 over a first portion or path of a contactless base device-adapter communications link 868 (e.g., CCXU 861 may be operative as a CCTU for transmitting data over a first portion of link 868 to CCXU 881 that may be operative as a CCRU), and where CCXU 883 may contactlessly communicatively couple with CCXU 863 over a second portion or path of contactless base device-adapter communications link 868 (e.g., CCXU 883 may be operative as a CCTU for transmitting data over a second portion of link 868 to CCXU 863 that may be operative as a CCRU). Moreover, as shown in FIG. 3, in some embodiments, base device-adapter connector interface 856 may include a first base device-adapter CCXU interface 857*a* and a second base device-adapter CCXU interface 857*b*, where first base device-adapter CCXU interface 857*a* may include one or more communications port(s)/channel(s) to communicate with any suitable portion(s) of respective first base device-adapter CCXU 861, and where second base device-adapter CCXU interface 857*b* may include one or more communications port(s)/channel(s) to communicate with any suitable portion(s) of respective second base device-adapter CCXU 863. Although illustrated as a contactless device-adapter communications link with two CCXU links, base device-adapter communications link 868 may include any other suitable number of CCXU links or may be any other suitable type of device-adapter communications link, including a mechanical link or a wireless link, which may support any suitable base device communications protocol(s).

Additionally or alternatively, base device 870 may be operative to communicate data and/or power with adapter device 840 according to a supplemental base device communications protocol via a supplemental base device adapter communications path that may include base device communications component 876, supplemental base device connector 884, a supplemental base device-adapter communications link 869, supplemental base device-adapter connector 864, supplemental base device-adapter connector interface 858, and/or controller 852, where supplemental base device-adapter communications link 869 may be established and/or managed between supplemental base device connector 884 and supplemental base device-adapter connector 864. Supplemental base device connector 884 and supplemental base device-adapter connector 864 may be a pair of any suitable connectors that may interact to create any suitable supplemental base device-adapter communications link 869 through which data and/or power may be communicated between connector 884 and connector 864. As just one example, supplemental base device connector 884 and supplemental base device-adapter connector 864 may be conventional mechanical connectors that may physically and/or mechanically mate with one another to create a physical and/or mechanical and/or electro-mechanical supplemental base device-adapter communications link 869 (e.g., connector 884 may be a male connector (e.g., a USB plug) that may physically fit within a corresponding female connector 864 (e.g., a USB receptacle), or vice versa, to create a physical communication channel), where data and/or power may be communicated between connectors 884 and 864 using any suitable supplemental base device communications protocol that may be supported or enabled by such a physical and/or mechanical and/or electro-mechanical supplemental base device-adapter communications link 869. As another example, supplemental base device connector 884 and supplemental base device-adapter connector 864 may be conventional wireless connectors that may wirelessly communicatively couple with one another to create a wireless supplemental base device-adapter communications link 869 (e.g., connector 884 may be an antenna or transducer that may wirelessly communicatively couple with corresponding connector 864 that may also be an antenna or transducer), where data and/or power may be communicated between connectors 884 and 864 using any suitable supplemental base device communications protocol that may be supported or enabled by such a wireless supplemental base device-adapter communications link 869. As yet another example, supplemental base device connector 884 and supplemental base device-adapter connector 864 may be contactless connectors that may contactlessly communicatively couple with one another to create a contactless supplemental base device-adapter communications link 869 (e.g., connector 884 may be an EHF contactless communication unit (e.g., unit 106) that may contactlessly communicatively couple with corresponding connector 864 that may also be an EHF contactless communication unit (e.g., unit 126)), where data and/or power may be communicated between connectors 884 and 864 using any suitable supplemental base device communications protocol that may be supported or enabled by such a contactless supplemental base device-adapter communications link 869. For example, as specifically shown in FIG. 3, supplemental base device connector 884 may include a first supplemental base device CCXU 885 and a second supplemental base device CCXU 887, and supplemental base device-adapter connector 864 may include a first supplemental base device-adapter CCXU 865 and a second supplemental base device-adapter CCXU 867, where CCXU 865 may contactlessly communicatively couple with CCXU 885 over a first portion or path of a contactless supplemental base device-adapter communications link 869 (e.g., CCXU 865 may be operative as a CCTU for transmitting data over a first portion of link 869 to CCXU 885 that may be operative as a CCRU), and where CCXU 887 may contactlessly communicatively couple with CCXU 867 over a second portion or path of contactless supplemental base device-adapter communications link 869 (e.g., CCXU 887 may be operative as a CCTU for transmitting data over a second portion of link 869 to CCXU 867 that may be operative as a CCRU). Moreover, as shown in FIG. 3, in some embodiments, supplemental base device-adapter connector interface 858 may include a first supplemental base device-adapter CCXU interface 859a and a second supplemental base device-adapter CCXU interface 859b, where first supplemental base device-adapter CCXU interface 859a may include one or more communications port(s)/channel(s) to communicate with any suitable portion(s) of respective first supplemental base device-adapter CCXU 865, and where second supplemental base device-adapter CCXU interface 859b may include one or more communications port(s)/channel(s) to communicate with any suitable portion(s) of respective second supplemental base device-adapter CCXU 867. Although illustrated as a contactless device-adapter communications link with two CCXU links, supplemental base device-adapter communications link 869 may include any other suitable number of CCXU links or may be any other suitable type of device-adapter communications link, including a mechanical link or a wireless link, which may support any suitable supplemental base device communications protocol(s).

Additionally or alternatively, auxiliary device 890 may be operative to communicate data and/or power with adapter device 840 according to an auxiliary device communications protocol via an auxiliary device adapter communications path that may include an auxiliary device communications component (not shown), auxiliary device connector 892, an auxiliary device-adapter communications link 833, auxiliary device-adapter connector 834, auxiliary device-adapter connector interface 855, and/or controller 852, where auxiliary device-adapter communications link 833 may be established and/or managed between auxiliary device connector 892 and auxiliary device-adapter connector 834. Auxiliary device connector 892 and auxiliary device-adapter connector 834 may be a pair of any suitable connectors that may interact to create any suitable auxiliary device-adapter communications link 833 through which data and/or power may be communicated between connector 892 and connector 834 according to any suitable auxiliary device communications protocol. As just one example, auxiliary device connector 892 and auxiliary device-adapter connector 834 may be conventional mechanical connectors that may physically and/or mechanically mate with one another to create a physical and/or mechanical and/or electro-mechanical auxiliary device-adapter communications link 833 (e.g., connector 892 may be a male connector (e.g., a USB plug) that may physically fit within a corresponding female connector 834 (e.g., a USB receptacle), or vice versa, to create a physical and/or mechanical and/or electro-mechanical communication channel), where data and/or power may be communicated between connectors 892 and 834 using any suitable auxiliary device communications protocol that may be supported or enabled by such a physical and/or mechanical and/or electro-mechanical auxiliary device-adapter communications link 833. As another example, auxiliary device connector 892 and auxiliary device-adapter connector 834 may be conventional wireless connectors that may wirelessly communicatively couple with one another to create a wireless auxiliary device-adapter communications link 833 (e.g., connector 892 may be an antenna or transducer that may wirelessly communicatively couple with corresponding connector 834 that may also be an antenna or transducer), where data and/or power may be communicated between connectors 892 and 834 using any suitable auxiliary device communications protocol that may be supported or enabled by such a wireless auxiliary device-adapter communications link 833. As yet another example, auxiliary device connector 892 and user device-adapter connector 834 may be contactless connectors that may contactlessly communicatively couple with one another to create a contactless auxiliary device-adapter communications link 833 (e.g., connector 892 may be an EHF contactless communication unit (e.g., unit 106) that may contactlessly communicatively couple with corresponding connector 834 that may also be an EHF contactless communication unit (e.g., unit 126)), where data and/or power may be communicated between connectors 892 and 834 using any suitable auxiliary device communications protocol that may be supported or enabled by such a contactless auxiliary device-adapter communications link 833. Although not specifically illustrated as a contactless device-adapter communications link, auxiliary device-adapter communications link 833 may be any suitable type of device-adapter communications link, including a mechanical link, a wireless link, or a contactless link that may include any suitable number of CCXU link(s), which may support any suitable auxiliary device communications protocol(s).

While only a single user device-adapter communications link 831 may be shown for communicatively coupling user device 810 and adapter 840, it is to be understood that any other suitable number of user device-adapter communications links may be provided for communicatively coupling user device 810 and adapter 840, each of which may be any suitable type of user device-adapter communications link that may be the same as or different than existing user device-adapter communications link 831, and/or each of which may support or enable any suitable user device communications protocol(s) that may be the same as or different than the user device communications protocol(s) supported or enabled by existing user device-adapter communications link 831. Additionally or alternatively, while only a single auxiliary device-adapter communications link 833 may be shown for communicatively coupling auxiliary device 890 and adapter 840, it is to be understood that any other suitable number of auxiliary device-adapter communications links may be provided for communicatively coupling auxiliary device 890 and adapter 840, each of which may be any suitable type of auxiliary device-adapter communications link that may be the same as or different than existing auxiliary device-adapter communications link 833, and/or each of which may support or enable any suitable auxiliary device communications protocol(s) that may be the same as or different than the auxiliary device communications protocol(s) supported or enabled by existing auxiliary device-adapter communications link 833. Additionally or alternatively, while two communications links (e.g., base device-adapter communications link 868 and supplemental base device-adapter communications link 869) may be shown for communicatively coupling base device 870 and adapter 840, it is to be understood that any other suitable number of communications links may be provided for communicatively coupling base device 870 and adapter 840, each of which may be any suitable type of communications link that may be the same as or different than either or both of communications links 868 and 869, and/or each of which may support or enable any suitable base device communications protocol(s) that may be the same as or different than the base device communications protocol(s) supported or enabled by either or both of communications links 868 and 869. It is also to be understood that any one or more of communications links 831, 833, 868, and 869, which may be of any suitable type (e.g., mechanical, wireless, contactless, etc.), may enable or support only one device communications protocol or a number of different device communications protocols. A device adapter communication link of a first type (e.g., a mechanical auxiliary device-adapter communications link 833) may support at least one device communications protocol (e.g., USB 3.0) that may also be supported by a device adapter communication link of a second type (e.g., a contactless base device-adapter communications link 868) that may be different than the first type. Additionally or alternatively, a first device-adapter communications link of a particular type (e.g., contactless, mechanical, etc.) may be configured in system 800 to support at least one device communications protocol (e.g., DisplayPort protocol) that may not be supported by a second device-adapter communications link of that same particular type (e.g., despite each one of base device-adapter communications link 868 and supplemental base device-adapter communications link 869 being provided as a contactless type of communications link, system 800 may be configured such that supplemental base device-adapter communications link 869 supports or otherwise uses a DisplayPort protocol and such that base device-adapter communications link 868 supports or otherwise uses another protocol that is not a DisplayPort protocol). Additionally or alternatively, a first device adapter communication link of any suitable type (e.g., a mechanical or wireless device-adapter communications link 831) may be configured in system 800 to support at least one communications protocol (e.g., USB 2.0) that may not be supported by a second device adapter communication link of any suitable type (e.g., a contactless base device-adapter communications link 868), where that second device adapter communication link may be configured in system 800 not to support that communications protocol (e.g., USB 2.0) but another communications protocol (e.g., USB SuperSpeed).

Power may be communicated over any suitable device-adapter communications link, with or without data, and such power may be utilized by a destination device in any suitable manner. For example, power may be received by adapter device 840 over any suitable device-adapter communications link (e.g., power may be received at connector 832 over link 831 from power supply 818 of user device 810 and may then be provided to battery 847 of power supply 848 (and/or vice versa from power supply 848 to power supply 818), power may be received at connector 834 over link 833 from a power supply of auxiliary device 890 and may then be provided to battery 847 of power supply 848 (and/or vice versa from power supply 848 to the auxiliary device power supply), and/or power may be received at inductor 849 of power supply 848 over a wireless power link 889 from power supply 878 of base device 870 (e.g., via inductor 888) and may then be provided to battery 847 of power supply 848 (and/or vice versa from power supply 848 to power supply 878). Adapter device 840 may be operative to utilize power available to power supply 848 (e.g., as stored in battery 847 or otherwise) to power any suitable components of system 800, including components of user device 810, components of base device 870, components of auxiliary device 890, and/or components of adapter device 840 itself.

Based on the number of device-adapter communications links available to adapter device 840, based on the type(s) of such device-adapter communications links, based on the device communications protocol(s) supported by such device-adapter communications links, and/or based on the data and/or power available to be communicated via such device-adapter communications links (e.g., to and/or from adapter device 840), adapter device 840 may be operative to automatically switch the data communication status (e.g., between disabled, enabled, idle, active, inactive, attentive, off, etc.) of one or more communication paths provided by system 800 (e.g., not only in response to the creation or the termination of a device-adapter communications link available to adapter device 840, but even when the device-adapter communications links available to adapter device 840 remain the same). Such communication paths provided by system 800 may include a user device adapter communication path between user device 810 and adapter device 840 (e.g., host subsystem 850 or peripheral component 844) via link 831, an auxiliary device adapter communication path between auxiliary device 890 and adapter device 840 (e.g., host subsystem 850 or peripheral component 844) via link 833, a user device auxiliary device adapter communication path between user device 810 and auxiliary device 890 (e.g., through adapter host subsystem 850) via links 831 and 833, a base device adapter communication path between base device 870 and adapter device 840 (e.g., host subsystem 850 or peripheral component 844) via link 868, a user device base device adapter communication path between user device 810 and base device 870 (e.g., through adapter host subsystem 850) via links 831 and 868, a supplemental base device adapter communication path between base device 870 and adapter device 840 (e.g., host subsystem 850 or peripheral component 844) via link 869, a user device supplemental base device adapter communication path between user device 810 and base device 870 (e.g., through adapter host subsystem 850) via links 831 and 869, and/or a base device auxiliary device adapter communication path between base device 870 and auxiliary device 890 (e.g., through adapter host subsystem 850) via links 868 and 833. In some embodiments, adapter device 840 may be operative to actively communicate data through two or more of the communication paths provided by system 800 simultaneously or substantially simultaneously or concurrently. Adapter device 840 may be operative to automatically switch the data communication status of one or more communication paths provided by system 800 (e.g., from disabled, inactive, idle, or off to enabled, active, or attentive (or vice versa)). Such a switch may occur even when the device-adapter communications links available to adapter device 840 remain unchanged (e.g., a user device adapter communication path between user device 810 and peripheral component 844 via link 831 may be switched between enabled and disabled despite link 831 being maintained and despite link 868 being maintained). Adapter device 840 may be operative to switch the data communication status of one or more communication paths provided by system 800 in response to an event that does not include a new device-adapter communications link being made available to adapter device 840 (e.g., when a mechanical device-adapter communications link is created due to physical insertion of a plug connector into a receptacle connector). Additionally or alternatively, adapter device 840 may be operative to switch the data communication status of one or more communication paths provided by system 800 in response to an event that does not include an existing device-adapter communications link available to adapter device 840 being terminated (e.g., when a mechanical device-adapter communications link is terminated due to physical removal of a plug connector from a receptacle connector). Adapter host subsystem 850 may be provided in any suitable way such that switch module 851 may be operative to receive any suitable control information (e.g., status information, including signal(s) or lack thereof) from any suitable source (e.g., from one or more suitable adapter connector interfaces 854-858 and/or from controller 852 and/or from peripheral subsystem 842) and to automatically adjust at least one connection between two or more data paths of adapter host subsystem 850 based on such received control information.

Figure 4:
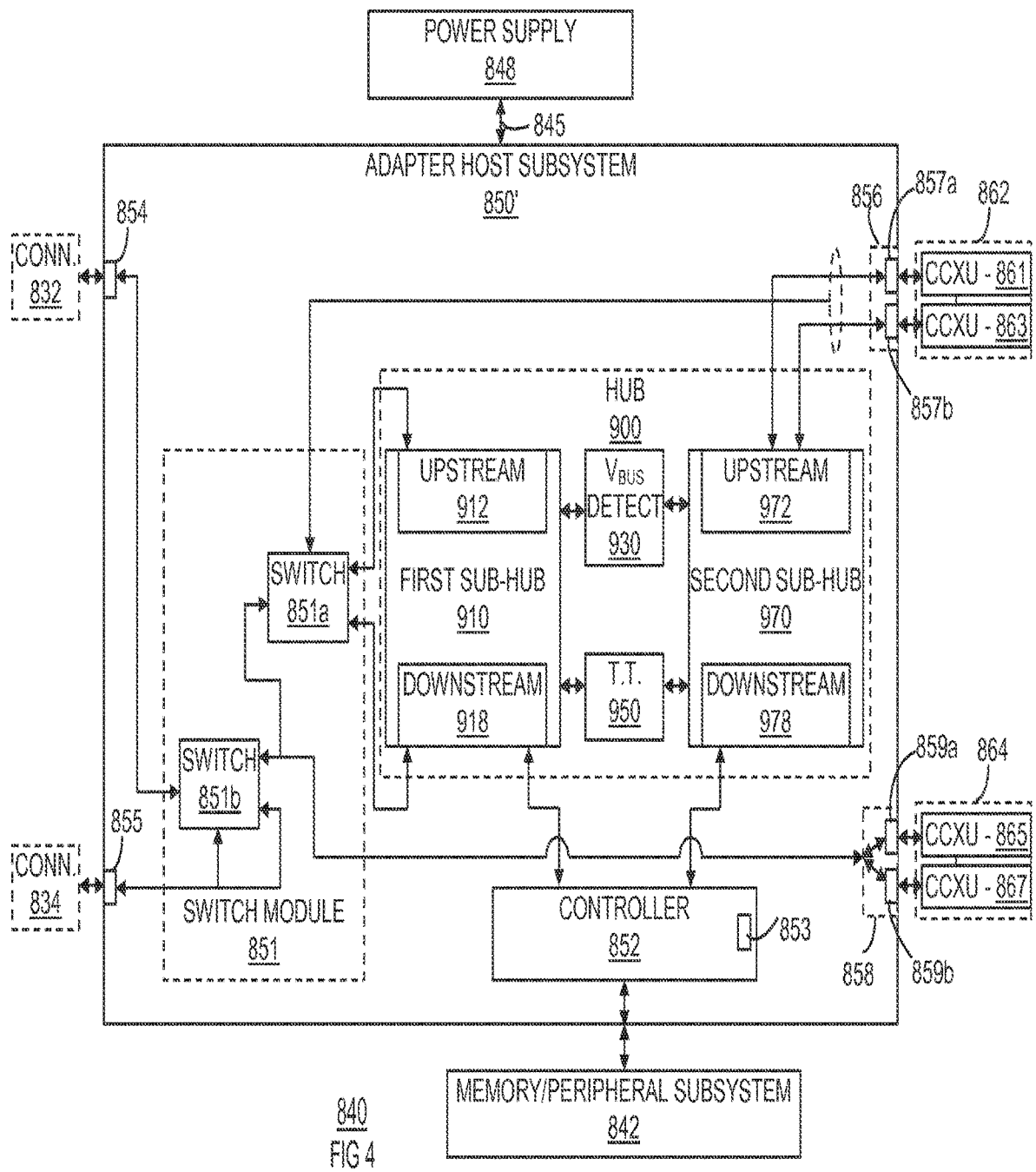
FIG. 4 is a detailed view of a particular portion of the system of FIG. 3, according to an embodiment.
Figure 5:
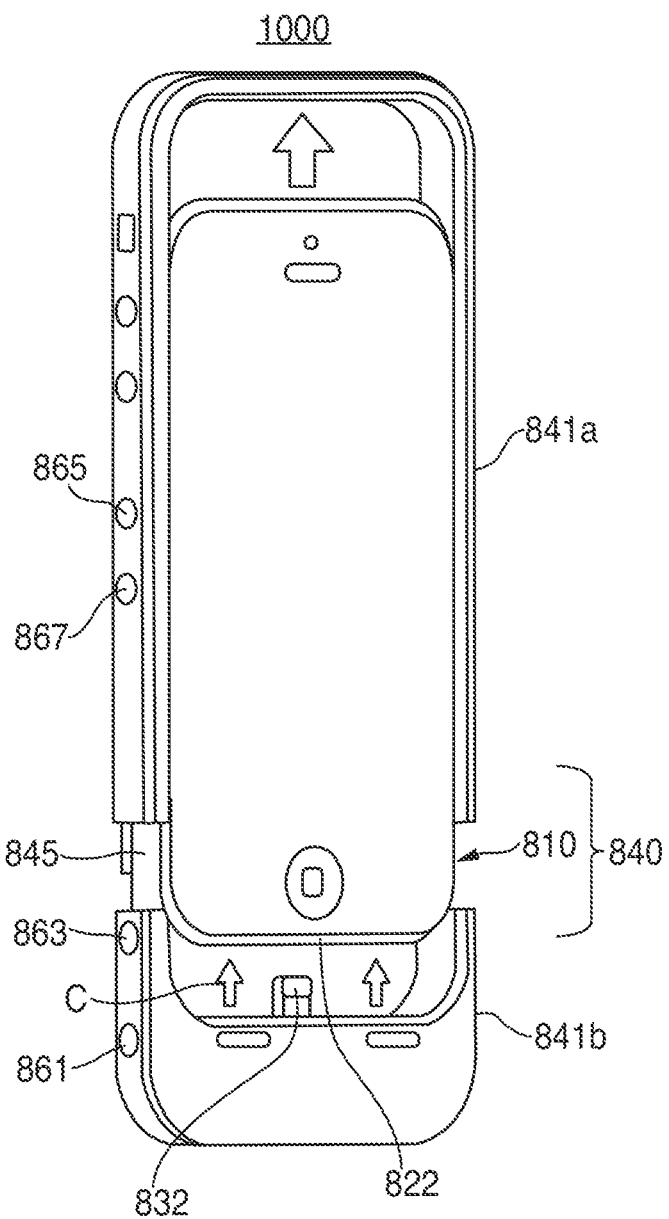
FIGS. 5-9 are illustrative views of the system of FIG. 3 in different configurations, according to various embodiments.

A hub, which may expand a single communication port into several ports for enabling connection of a data host to multiple components, may be provided by adapter host subsystem 850 for enabling certain functionality of adapter device 840. A particular embodiment of an adapter host subsystem of adapter device 840 of system 800 of FIG. 3 may include a hub that may be operative to enable certain features of this disclosure. For example, as shown in FIG. 4, adapter device 840 of system 800 may include a particular adapter host subsystem 850' with a hub 900, which may be a particular embodiment of subsystem 850 of FIG. 3. As shown, adapter host subsystem 850' may include user device-adapter connector interface 854 for communication with user device-adapter connector 832, auxiliary device-adapter connector interface 855 for communication with auxiliary device-adapter connector 834, base device-adapter connector interface 856 for communication with base device-adapter connector 862, supplemental base device-adapter connector interface 858 for communication with supplemental base device-adapter connector 864, controller 852 running application 853, switch module 851, and bus 845 that may provide one or more wired or wireless communication links or paths for transferring data and/or power to, from, or between various components of device 840 (e.g., including peripheral subsystem 842 and power supply 848, as well as amongst the various components of adapter host subsystem 850'). Moreover, as shown, adapter host subsystem 850' may include hub 900, which may be any suitable I/O controller hub that may be compatible with any suitable communication protocol(s). In a particular specific embodiment, hub 900 may be any suitable USB compliant hub, such as a USB 3.0 compliant hub, which may be similar to or share certain characteristics of USB Hub TUSB8040 made available by Texas Instruments. In such embodiments, as shown, hub 900 may include a $V_{BUS}$ detect module 930, a first sub-hub 910, and a second sub-hub 970. First sub-hub 910 may be operative to support one or more first communication protocols and second sub-hub 970 may be operative to support one or more second communication protocols that may be the same as or different than the first communication protocol(s) of first sub-hub 910. In some particular embodiments, the maximum capability (e.g., data transfer speed) of the first communication protocol(s) of first sub-hub 910 may be less than the maximum capability (e.g., data transfer speed) of the second communication protocol(s) of second sub-hub 970. For example, when hub 900 may be a USB 3.0 compliant hub, first sub-hub 910 may be a USB 2.0 compliant sub-hub (e.g., via backward compliance of USB 3.0) while second sub-hub 970 may be a USB SuperSpeed compliant sub-hub (e.g., via a SuperSpeed transfer mode of USB 3.0 that can transfer data at 5 Gbit/s, which may be more than ten times faster than the USB 2.0 standard), although it is to be understood that any other suitable combination of sub-hubs with any suitable respective capabilities may be provided by hub 900.

First sub-hub 910 may include an upstream port 912 and at least one downstream port 918, while second sub-hub 970 may include an upstream port 972 and at least one downstream port 978. Following the example where hub 900 may be a USB 3.0 compliant hub, where first sub-hub 910 may be a USB 2.0 compliant sub-hub, and where second sub-hub 970 may be a USB SuperSpeed compliant hub, the USB 2.0 compliant upstream port 912 of first sub-hub 910 (e.g., positive and negative USB high-speed (2.0) compliant differential transceiver pins) and the USB SuperSpeed compliant upstream port 972 of second sub-hub 970 (e.g., positive and negative USB SuperSpeed compliant differential pairs of transmitter/receiver pins) may collectively provide an upstream port for hub 900, while the USB 2.0 compliant downstream port(s) 918 of first sub-hub 910 (e.g., a number of sets of positive and negative USB high-speed (2.0) compliant differential transceiver pins) and the USB SuperSpeed compliant downstream port(s) 978 of second sub-hub 970 (e.g., a number of sets of positive and negative USB SuperSpeed compliant differential pairs of transmitter/receiver pins) may collectively provide the downstream ports for hub 900. In such embodiments, controller 852 may be any suitable controller, such as a USB 3.0 flash memory controller (e.g., a USB memory IC or USB memory interface). Controller 852 may be a dedicated direct memory access (DMA) controller that may be utilized for moving data between adapter memory 844 and memory of user device 810 and/or memory of base device 870 at the fastest possible rate. A flash controller may be configured to operate like a DMA controller.

In some embodiments, rather than coupling each pin or even most pins of the upstream port of hub 900 (e.g., the pins of both upstream port 912 and upstream port 972) to multiple device-adapter connectors of adapter device 840 (e.g., to user device-adapter connector 832 via user device-adapter connector interface 854 and to base device-adapter connector 862 via base device-adapter connector interface 856), adapter host subsystem 850' may be configured such that only a certain first portion of the pins of the upstream port of hub 900 (e.g., only the pins of upstream port 912 of first sub-hub 910) may be coupled to a first device-adapter connector of adapter device 840 (e.g., to user device-adapter connector 832 via user device-adapter connector interface 854 (e.g., via switch module 851)) and such that that only a certain second portion of the pins of the upstream port of hub 900 (e.g., only the pins of upstream port 972 of second sub-hub 970) may be coupled to a second device-adapter connector of adapter device 840 (e.g., to base device-adapter connector 862 via base device-adapter connector interface 856 (e.g., directly)).

Such a configuration may be enabled, for example, when a particular device-adapter connector of adapter device 840 need not support a particular communication protocol that is only supported by first sub-hub 910 but not supported by second sub-hub 970 and/or when a particular device-adapter connector of adapter device 840 need only support a particular communication protocol that is only supported by second sub-hub 970 but not supported by first sub-hub 910 (or vice versa). For example, such a configuration may be enabled when base device-adapter connector 862 of adapter device 840 need not support a particular communication protocol (e.g., USB 2.0) that is only supported by first sub-hub 910 but not supported by second sub-hub 970 and/or when base device-adapter connector 862 of adapter device 840 need only support a particular communication protocol (e.g., USB SuperSpeed) that is only supported by second sub-hub 970 but not supported by first sub-hub 910 (or vice versa). Such a situation may occur when base device-adapter connector 862 of adapter device 840 is configured to establish and/or manage and/or otherwise communicate via a contactless base device-adapter communications link 868, as such a contactless device-adapter communications link may enable data communication at suitable data rates (e.g., at least data rates supported by USB 3.0 or USB 3.1 or USB Type C or USB SuperSpeed or USB SuperSpeed+ or Apple Lightning or Thunderbolt or any other suitable current or future protocol or standard), whereby adapter device 840 may be configured under the assumption or knowledge that such a contactless base device-adapter communications link 868 of base device-adapter connector 862 may not need not support a particular (e.g., inferior or slower) communication protocol (e.g., USB 2.0) that is only supported by first sub-hub 910 but not supported by second sub-hub 970. That is, adapter host subsystem 850' may be configured under the assumption or knowledge that one, some, or all contactless device-adapter connectors (e.g., base device-adapter connector 862 and/or supplemental base device-adapter connector 864) of adapter device 840 may not need to support an inferior communication protocol (e.g., USB 2.0 protocol) that is only supported by first sub-hub 910, such that the portion of the upstream port of hub 900 provided by upstream port 912 of first sub-hub 910 may be communicatively coupled to user device-adapter connector interface 854 for use by user device-adapter connector 832 and link 831 with user device 810 without the need to also enable communicative coupling of that upstream port 912 of first sub-hub 910 to base device-adapter connector interface 856 for use by base device-adapter connector 862 and link 868 with base device 870.

Therefore, adapter host subsystem 850' may be configured to communicatively couple base device-adapter connector interface 856 (and thus base device 870) to the upstream port of hub 900 (e.g., to upstream port 972 of second sub-hub 970) always or at least during a portion of the time that user device-adapter connector interface 854 (and thus user device 810) may be communicatively coupled to the upstream port of hub 900 (e.g., to upstream port 912 of first sub-hub 910), which may thereby enable rapid and/or automatic and/or user-transparent switching of active data communication from a first communication path between hub 900 and user device 810 to a second communication path between hub 900 and base device 870, and/or which may enable simultaneous active data communication along both a first communication path between hub 900 and user device 810 and a second communication path between hub 900 and base device 870. As also shown, a communication path may extend between a downstream port 918 and switch 851*a*, a communication path may extend between a downstream port 918 and controller 852, a communication path may extend between a downstream port 978 and controller 852, and a communication path may be enabled by a transaction translator (T.T.) component 950 to extend between upstream port 972 and the downstream port 918. In some embodiments, hub 900 may be operative to convert data from a first communications protocol to a second communications protocol (e.g., from USB 2.0 to USB SuperSpeed (or vice versa)), such as without relying on such functionality of controller 852. In some particular embodiments, transaction translator component 950 may be operative to do such a conversion for enabling compatible data communication between upstream port 972 (e.g., with USB SuperSpeed protocol) and the downstream port 918 (with USB 2.0 protocol).

Switch module 851 of adapter host subsystem 850' may be configured to adjust what communication path(s) of adapter device 840 may be enabled using any suitable control instructions. For example, switch module 851 may include any suitable switches (e.g., switch 851*a* and/or switch 851*b*, which may be multiplexers or any other suitable switching components) that may be intercoupled with various components of adapter host subsystem 850' in any suitable manner for adjusting such communication path enablement. As shown, an input (e.g., on the left hand side) of a switch 851*b* may be coupled to a communication path that may extend between that input of switch 851*b* and user device-adapter connector interface 854, while a first output (e.g., on the upper right hand side) of switch 851*b* may be coupled to a communication path that may extend between that first output of switch 851*b* and an input (e.g., on the left hand side) of switch 851*a* as well as to a communication path that may extend between that first output of switch 851*b* and supplemental base device-adapter connector interface 858, while a second output (e.g., on the lower right hand side) of switch 851*b* may be coupled to a communication path that may extend between that second output of switch 851*b* and auxiliary device-adapter connector interface 855, while a control input (e.g., on the bottom side) of switch 851*b* may be coupled to a communication path that may extend between that control input of switch 851*b* and auxiliary device-adapter connector interface 855, while a first output (e.g., on the upper right hand side) of switch 851*a* may be coupled to a communication path that may extend between that first output of switch 851*a* and upstream port 912 of first sub-hub 910 of hub 900, while a second output (e.g., on the lower right hand side) of switch 851*a* may be coupled to a communication path that may extend between that second output of switch 851*a* and a downstream port 918 of first sub-hub 910 of hub 900, and while a control input (e.g., on the top side) of switch 851*a* may be coupled to a communication path that may extend between that control input of switch 851*a* and any suitable control signal source that may be related to base device-adapter connector interface 856 (e.g., a source operative to receive one or more particular types of signals or instructions (e.g., a link detect output) from base device 870 via link 868). Such a configuration may enable the following operation:

(1) if an active data transfer exists or is to be initiated between adapter host subsystem 850' and base device 870, any suitable control signal that may be related to base device-adapter connector interface 856 and/or indicative of that active data transfer state (e.g., from data communicated to interface 856, such as based on any suitable state of any pin of EHF connector 862 as may be described above with respect to FIGS. 1 and 2 (e.g., when base device 870 wants to communicate data with adapter device 840, base device 870 may assert a link pin at connector 882 (e.g., idle mode to data transfer mode), and such a link assert may be communicated contactlessly to adapter device 840 over link 868, where such a received link assert may be communicated as such a control signal)) may be provided as a first type of control to the control input of switch 851a for coupling the input of switch 851a to the second output of switch 851a (e.g., for coupling the input of switch 851a to a downstream port 918 of first sub-hub 910 of hub 900), where the input of switch 851a may be coupled to interface 854 and user device 810 (e.g., via switch 851b) such that a data communication path may be enabled between user device 810 and a downstream port of hub 900 while another data communication path between base device 870 and the upstream port of hub 900 may be actively transferring data, whereby a first communication path between base device 870 and memory subsystem 842 (e.g., via upstream port 972 and downstream port 978 and controller 852) may be active for communicating data between base device 870 and memory component 844 while a second communication path between base device 870 and user device 810 (e.g., via upstream port 972 and transaction translator component 950 and downstream port 918 and switch module 851) may also be active for communicating data between base device 870 and user device 810;

(2) if an active data transfer does not exist or is to be terminated between adapter host subsystem 850' and base device 870, any suitable control signal that may be related to base device-adapter connector interface 856 and indicative of that non-active data transfer state (e.g., from data communicated at interface 856, such as based on any suitable state of any pin of EHF connector 862 as described above with respect to FIGS. 1 and 2 (e.g., when base device 870 is done communicating data with adapter device 840, base device 870 may disassert its link pin at connector 882, and such a link disassert may be communicated contactlessly to adapter device 840 over link 868, where such a received link disassert may be utilized as such a control signal)), may be provided as a second type of control to the control input of switch 851a (e.g., for "releasing" a connection between base device 870 and adapter device 840 (e.g., without physically removing adapter device 840 from base device 870)) by coupling the input of switch 851a to the first output of switch 851a (e.g., for coupling the input of switch 851a to the upstream port 912 of first sub-hub 910 of hub 900), where the input of switch 851a may be coupled to interface 854 and user device 810 (e.g., via switch 851b, when no connection is active between auxiliary device 890 and user device 810, as described below with respect to situation (3)) such that a data communication path may be enabled between user device 810 and the upstream port of hub 900 (e.g., upstream port 912) while no data is being communicated with base device 870 via the upstream port of hub 900 (e.g., upstream port 972), whereby a communication path between user device 810 and memory subsystem 842 (e.g., via switch module 851 and upstream port 912 and downstream port 918 and controller 852) may be active for communicating data between user device 810 and memory component 844, and, whereby, in some embodiments, at least a portion (e.g., DisplayPort protocol data) of data at the first output of switch 851b may be provided along the communication path between that output and interface 858 (e.g., for communicating certain data between user device 810 and supplemental base device connector 884 via switch 851b, which may be done alternatively to or simultaneously with the communication of data between user device 810 and memory subsystem 842 (e.g., via switch module 851 and upstream port 912 and downstream port 918 and controller 852)); and (3) if a communication path exists across auxiliary device-adapter communications link 833 between adapter host subsystem 850' and auxiliary device 890, any suitable control signal that may be related to auxiliary device-adapter connector interface 855 and/or otherwise indicative of that existing communication path (e.g., from data communicated between interface 855 and switch module 851) may be provided as a first type of control to the control input of switch 851b for coupling the input of switch 851b to the second output of switch 851b (e.g., for coupling interface 854 to interface 855) such that a data communication path may be enabled between user device 810 and auxiliary device 890 while no communication path is coupled to the input of switch 851 and no data is being communicated to hub 900 (or memory component 844) from switch module 851 and, thus, from user device 810 and/or from auxiliary device 890, and yet a communication path between base device 870 and memory component 844 (via hub 900) may still be enabled.

It is to be understood that if no communication path exists across auxiliary device-adapter communications link 833 between adapter host subsystem 850' and auxiliary device 890, any suitable control signal that may be related to auxiliary device-adapter connector interface 855 and/or otherwise indicative of that non-existing communication path (e.g., from data or power communicated (or not communicated) between interface 855 and switch module 851) may be provided as a second type of control to the control input of switch 851b for coupling the input of switch 851b to the first output of switch 851b (e.g., for coupling interface 854 to the input of switch 851a and/or to interface 858) such that a data communication path may be enabled between user device 810 and switch 851a and/or between user device 810 and supplemental base device connector 884 while no communication path is coupled to the second output of switch 851b and no data is being communicated to auxiliary device 890 via adapter host subsystem 850'. Any suitable control signal or lack thereof may be utilized by switch module 851, such as any instruction that may be communicated by base device 870 (e.g., base device processor 872) to connector 862, any sensed characteristic at connector 862 (e.g., strength of signal at connector 862 or specific pattern of data flowing through connector 862 (e.g., that may suggest a characteristic of link 868), and the like, which may be processed in any suitable way by component(s) of connector 868 (e.g., components 110, 114, and/or 116 of FIG. 1) or by controller 852 prior to use by switching module 851. In other embodiments, the input of switch 851a may be coupled to a communication path that may extend between that input of switch 851a and user device-adapter connector interface 854, such that one or more of switch 851b, interface 855, and/or interface 858 may be ignored by or removed from adapter host subsystem 850'.

In other embodiments, adapter host subsystem 850 of FIG. 3 may not include a hub but may rather include controller 852 intercoupled with various interfaces 854-858 and switch module 851 for operating adapter device 840. For example, in such embodiments, controller 852 may be operative to control switch module 851 to either communicatively couple interface 856 and base device 870 to memory subsystem 842 or to communicatively couple interface 854 and user device 810 to memory subsystem 842 (e.g., based on any suitable control data, such as that described above with respect to the different control inputs for use at switch 851*a*). When such a controller 852 may be operative to communicatively couple interface 856 and base device 870 to memory subsystem 842, interface 854 and interface 855 may be able to be communicatively coupled such that user device 810 and auxiliary device 890 may communicate. Alternatively in other embodiments, adapter host subsystem 850 of FIG. 3 may include a PCI Express hub (e.g., rather than a USB hub 900) intercoupled with controller 852 and various interfaces 854-858 and switch module 851 for operating adapter device 840. In such embodiments, the PCI Express hub may be operative to simultaneously enable a first communications path between interface 856 (base device 870) and memory subsystem 842 via both the PCI Express hub and controller 852, at the same time as a second communications path between interface 856 (base device 870) and interface 854 (user device 810) via the PCI Express hub but not via controller 852 (e.g., such that base device 810 may be interpreted by base device 870 using PCI Express as a peripheral component like memory component 844). A PCI hub may be utilized to connect user device 810 to base device 870 similarly to hub 900, but a communicative coupling between connector 832 and an appropriate downstream port may be switchable between connector 832 and a PCIe USB controller.

Figure 10:
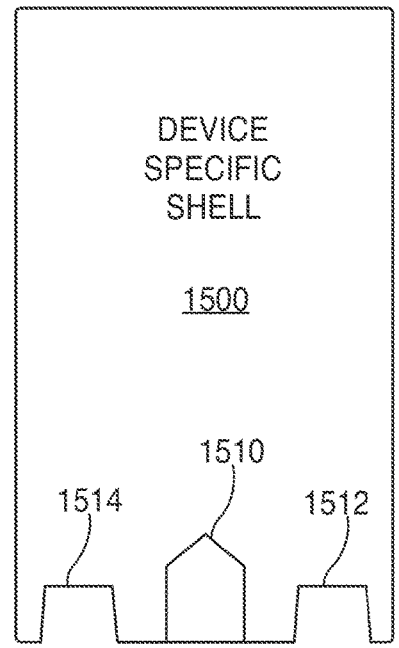
FIG. 10 shows an illustrative device specific shell, according to an embodiment.
Figure 11:
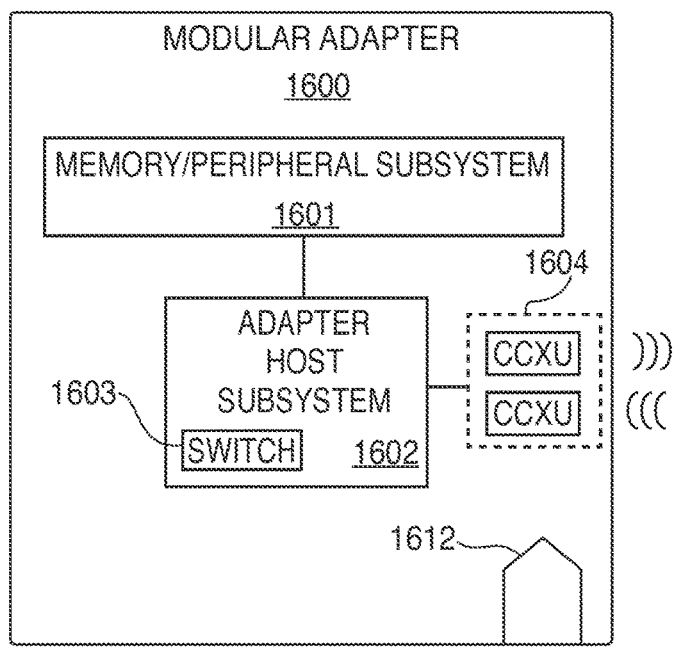
FIG. 11 shows an illustrative modular adapter, according to an embodiment.
Figure 12:
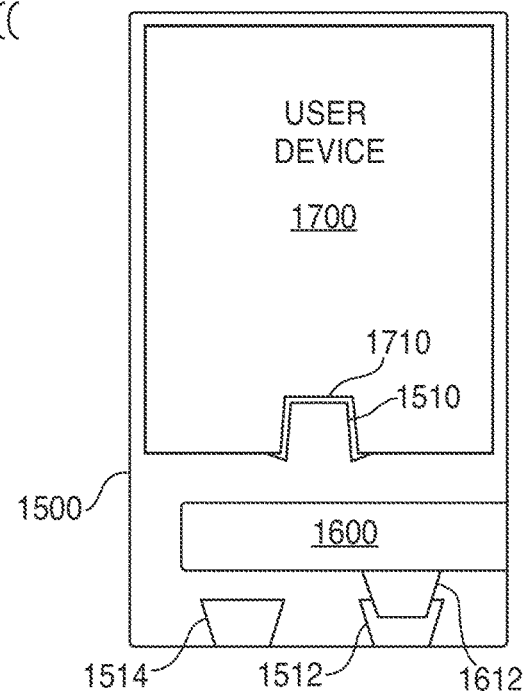
FIG. 12 shows an illustrative schematic diagram in which a user device, device specific shell, and modular adapter are all coupled together, in accordance with an embodiment.

The various devices of system 800 may be implemented in various configurations. For example, in some embodiments, user device 810 may be a generally mobile device, such as a cellular telephone (e.g., a smart phone like the iPhone by Apple Inc.), that may be regularly communicatively coupled to adapter device 840 or that may include adapter device 840 permanently integrated as a portion of that mobile device. For example, in some embodiments, as shown in FIGS. 10-12, adapter device 840 may be provided as a protective sleeve or outer cover for user device 810, where adapter device housing 841 may be provided as a top adapter device housing portion 841*a* and a bottom adapter device housing portion 841*b* that may be joined about user device 810 (e.g., by coupling housing portions 841*a* and 841*b* in the direction of arrows C of system 1000 of FIG. 5 (e.g., via portions of bus 845)) to provide the unitary adapter device housing 841 of FIGS. 6 and 7. As shown, user device-adapter connector 832 may be a physical male connector that may be mated with a physical female user device connector 822 (e.g., a mechanical USB-supporting connector (e.g., Apple Lightning connector or microUSB connector) that may often be found on such mobile devices). At least a transducer/antenna portion of each one of CCXUs 861, 863, 865, and 867 of base device-adapter connector 862 and supplemental base device-adapter connector 864 may be functionally positioned at any suitable position along any suitable exterior surface or within any suitable wall of adapter device housing 841. For example, as shown, CCXUs 861, 863, 865, and 867 may each be provided along a left side wall of housing 841. In other embodiments, a CCXU 863' may be positioned along a bottom wall of housing 841 that may be adjacent (e.g., perpendicular) to the left side wall along which CCXUs 861, 865, and 867 may be provided, such that paths of a link 868' of CCXUs 861 and 863' may be formed at an angle (e.g., at a 90° angle) while an alternate link 868 of CCXUs 861 and 863 may be formed along a single substantially planar wall (e.g., when user device 810 with adapter device 840 may be positioned within a cradle or dock base device 870, as shown in FIG. 7). Different orientations of CCXU sets of adapter device 840 at one or more various walls of housing 841 may enable establishment of different communication links with different base devices with different mechanical structures and different CCXU orientations, may enable data transfer using different communication protocols for different base device connectors, and the like. As just one example, when both adapter device housing 841 and base device housing 871 are at least partially plastic, such plastic housings may act as waveguides for link 868 and/or link 869. Depending on the configuration of CCXUs 861/863/863' of adapter device 840, the waveguides may be positioned to allow adapter device 840 and base device 870 to communicate in different orientations with respect to one another. For example, adapter device 840 may be configured as a sleeve around user device 810 so that that adapter device 840 may wrap around user device 810. The waveguides may wrap around the sides and base of user device 810 where there may be CCXUs that may allow for contactless communication with base device 870. Having waveguides wrapped around the side and the base of adapter device 840 may allow both side and top/bottom firing from the contactless communication units, such that data transfer between adapter device 840 and base device 870 may occur as long as the CCXUs of adapter device 840 are generally in-line with the CCXUs of base device 870.

Base device 870 may be operative to be temporarily coupled to adapter device 840 when adapter device 840 about user device 810 may be functionally positioned with respect to base device 870 such that CCXUs 861/863 or CCXUs 861/863' and/or CCXUs 865/867 may be functionally aligned with CCXUs 881/883 or CCXUs 881/883' and/or CCXUs 885/887 for forming links 868 or links 868' and/or links 869 between adapter device 840 and base device 870. For example, base device 870 may be a cradle or kiosk or any other suitable device (e.g., a generally stationary device) that may be utilized for easily positioning adapter device 840 adjacent thereto for enabling one or more of links 868/869 (e.g., in a docking position of FIG. 7).

Figure 6:
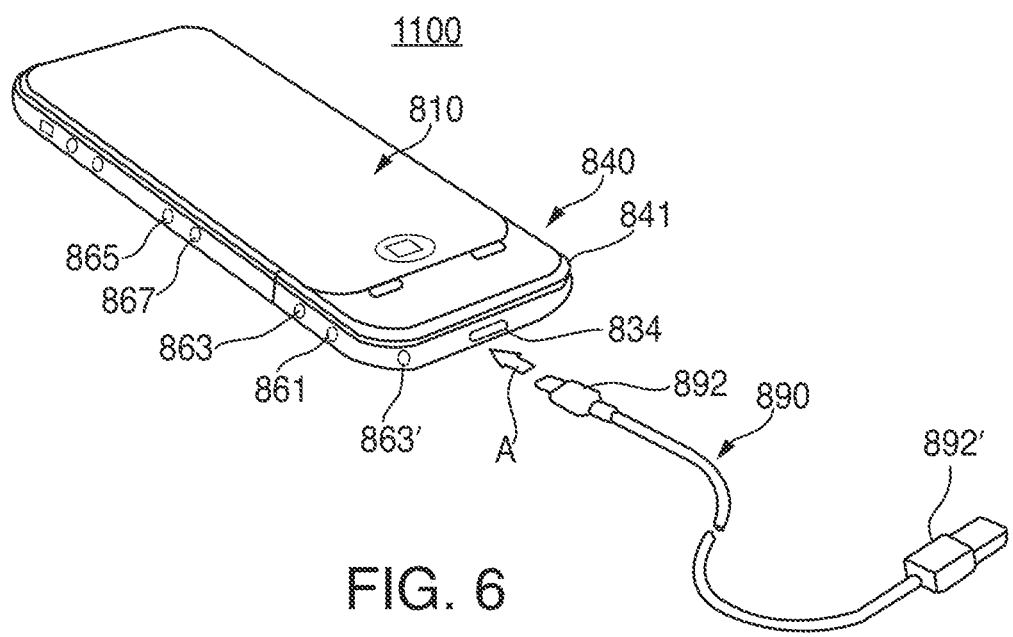
Figure 7:
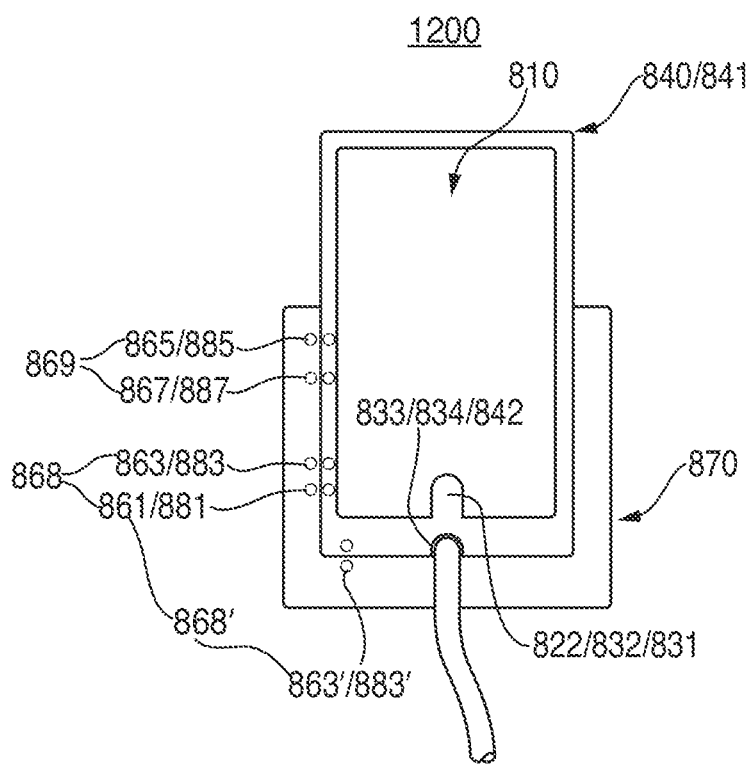

As also shown in system 1100 of FIG. 6 and/or system 1200 of FIG. 7, auxiliary device 890 may include a cable with auxiliary connector 832 as a physical male connector (e.g., a mechanical USB-supporting connector (e.g., Apple Lightning connector or microUSB connector) that may often be found on such mobile devices) that may be mated with a physical female auxiliary device-adapter connector 834 of adapter device 840 for enabling auxiliary device 890 (e.g., other components that may be coupled to connector 892' of auxiliary device 890) to be communicatively coupled to adapter device 840 via link 833, which may even be enabled when adapter device 840 is functionally positioned with respect to base device 870 (e.g., as shown by system 1200 of FIG. 7).

Therefore, adapter device 840 may be substantially continuously "worn" by user device 810 (e.g., as a protective cover) such that link 831 may be substantially continuously available between user device connector 822 and user device-adapter connector 832 to enable a communication path between user device 810 and adapter device 840 whenever needed, while adapter device 840 may be intermittently positioned at or on or adjacent to base device 870 when desired by a user of user device 810 such that link 868 and/or link 869 may be intermittently available between base device-adapter connectors 862/864 and base device connectors 882/884 to intermittently enable communication path(s) between adapter device 840 and base device 870. However, when adapter device 840 is functionally positioned relative to base device 870 for enabling communication path(s) between adapter device 840 and base device 870, data may be communicated along such a path for certain durations (e.g., when it is determined (e.g., by base device application 873 and/or adapter device application 853) that synchronization data ought to be communicated for syncing base device memory 874 and adapter memory 844), while data may or may not be communicated along such a path for certain other durations (e.g., when it is determined (e.g., by base device application 873 and/or adapter device application 853) that synchronization data need not be communicated for any further syncing of base device memory 874 and adapter memory 844) such that active communication of data between user device 810 and adapter device 840 may be enabled, as described above with respect to FIG. 4 (e.g., when it is determined (e.g., by user device application 813 and/or adapter device application 853) that synchronization data ought to be communicated for any further syncing of user device memory 814 and adapter memory 844). Therefore, due to adapter device 840 substantially continuously communicatively coupled to user device 810 (e.g., as a protective cover, which may provide additional memory for user device 810 during most use cases of device 810) such that link 831 may be substantially continuously available, data may be synced between user device 810 and adapter device 840 at any suitable time, whether or not adapter device 840 is docked to base device 870, while adapter device 840 may be synced with base device 870 only during certain periods of time when adapter device 840 is docked to base device 870 and link 868 is available. Due to link 831 being operative to support a communication protocol that may be slower than a communication protocol that may be supported by link 868 (e.g., USB 2.0 versus USB SuperSpeed), the substantially continuous availability of link 831 may enable such slower communication between user device 810 and adapter device 840 to occur at any suitable time (e.g., in the background while a user may utilize user device 810 for any suitable purpose), while the intermittent availability of link 868 may lend itself to the benefit of the faster communication between adapter device 840 and base device 870 at such intermittent times. Therefore, rapid synching between memory 874 of base device 870 and memory 814 of user device 810 is possible without requiring to do so directly between memories 874 and 814 but instead via adapter memory 844.

Figure 8:
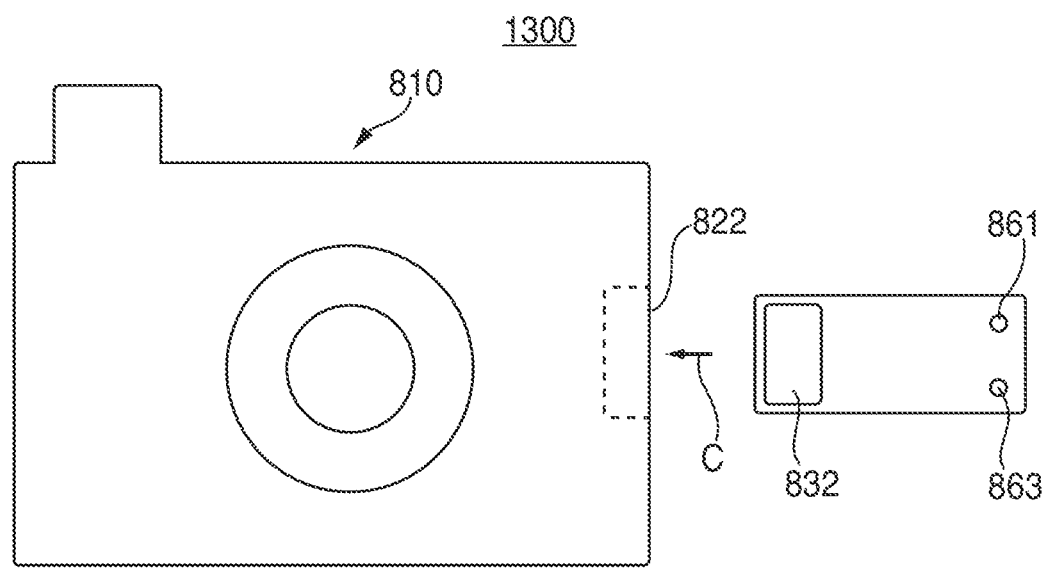
Figure 9:
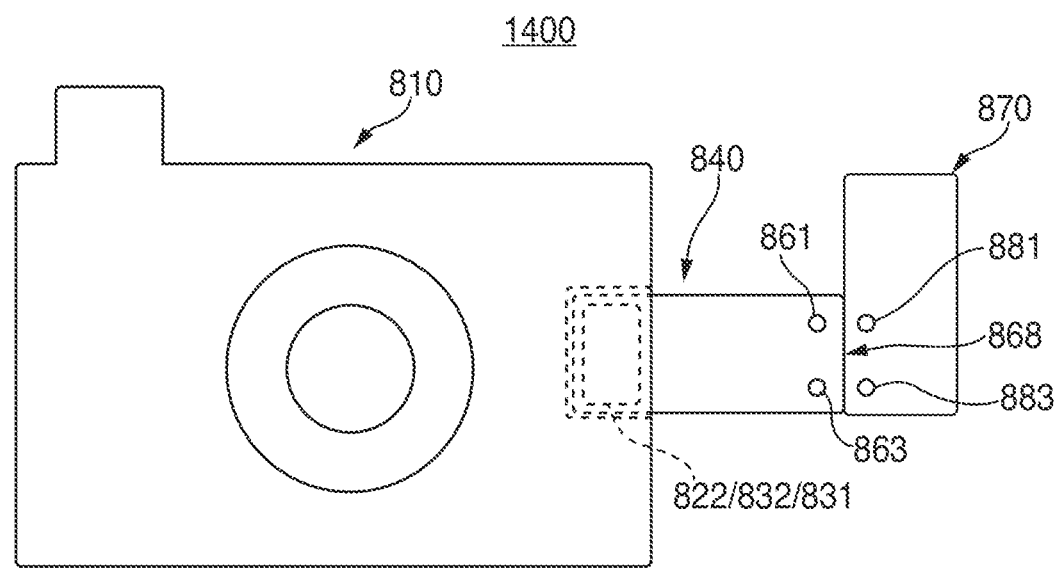

In other embodiments, as shown in FIGS. 8 and 9, for example, adapter device 840 may be provided as a removable memory card (e.g., where adapter housing 841 may have a form factor similar to an SD card or similar removable card) for insertion into or other suitable coupling with user electronic device 810, which may be a camera or other suitable device that may benefit from additional memory. As shown, user device-adapter connector 832 may be a physical male connector that may be mated with a physical female connector 822 of user device 810 (e.g., in the direction of arrow C of system 1300 of FIG. 8) for generating link 831 of system 1400 of FIG. 9. Base device 870 may be any suitable device that may be intermittently functionally positioned with respect to adapter device 840 when and/or not when link 831 may exist between devices 810 and 840 such that link 868 between CCXUs 861, 863, 881, and 883 may be formed.

In other embodiments, adapter device 840 may be physically integrated into user device 810 (e.g., such that user device-adapter connector interface 854 may be permanently communicatively coupled to a portion of user device 810 (e.g., user device bus 815), whereby user device-adapter connector 832 may not be utilized or even provided by such an adapter device). In such embodiments, adapter device 840 may dynamically change between protocols and specifications as needed. An example may be USB on-the-go (OTG), where user device 810 may have a built-in adapter device 840 with CCXUs 861, 863, 865, and 867 while base device 870 may have CCXUs 881, 883, 885, and 887 that are compatible with USB OTG. The CCXUs of user device 810 and base device 870 may facilitate data transfer between the user device and base device. In such embodiments where adapter device 840 may be integrated into user device 810, controller 852 may be provided as a portion of user device processor 812 (e.g., on a System on Chip (SOC)).

As mentioned, adapter device 840 may include storage functionalities with different encryption rules. The rules for transferring data out of memory component 844 of adapter device 840 may be the same or different from the rules for transferring data into memory component 844. For example, data from user device 810 may be transferred (e.g., via USB 2.0 protocol) to controller 852 and memory component 844 via security component 846 with particular encryption rules. Whether the data may be transferred from user device 810 to base device 870 may depend on the encryption rules when attempting to transfer data from memory component 844 to base device 870. Such encryption rules may include factors such as which devices, users, accounts, etc. are involved in the data transfer(s). In some cases, user device data may be transferred from user device 810 to adapter device 840 and to base device 870, and base device data may be transferred from base device 870 to adapter device 840, however such base device data may not be transferred from adapter device 840 to user device 810. When adapter device 840 is separate from user device 810, memory component 844 may be separate from user device memory 814 and from base device memory 874. In examples where adapter device 840 is built-in to user device 810, memory component 844 may be separate or may be a partition from user device memory 814. In the example where adapter 840 is built-in to user device 810, it may be that data from the general user device memory 814 of user device 810 may be freely transferred to adapter memory 844 and to base device 870. However, storage in the partition with encryption may only be transferred to specific devices and not others. In another example, a distinct adapter device 840 may not be required if both user device 810 and base device 870 have compatible contactless EHF communication units. In such an example, user device memory 814 and a first integrated adapter memory 844 on user device 810 and/or base device memory 874 and a second integrated adapter memory 844 on base device 870 may be partitioned in the respective devices where the partitions may have different encryption rules or there may simply be separate storage components, where the different storage components may have different storage rules. In some embodiments, adapter memory 844 may include at least a first portion that may be accessible by user device 810, a second portion that may be accessible by base device 870, and a third portion that may be accessible by adapter host subsystem 850. In all the above examples, a user may determine which storage component or partition the data should be transferred to or from.

When user device 810 includes an integrated adapter device 840, memory 844 of that adapter device 840 may be a partitioned portion of user device memory 814 or may be a distinctly separate memory from user device memory 814 (e.g., the "host" memory of that user device), and, similarly, when base device 870 includes an integrated adapter device 840, memory 844 of that adapter device 840 may be a partitioned portion of base device memory 874 or may be a distinctly separate memory from base device memory 874 (e.g., the "host" memory of that base device). Additionally or alternatively, in such embodiments, controller 852 of the adapter device integrated into each one of the user device and the base device may be a dedicated DMA controller that may be utilized for moving data between the adapter memory of user device 810 and the adapted memory of base device 870 (e.g., flash storage to flash storage) at the fastest possible rate (e.g., via CCXUs of the user device's integrated adapter device and respective CCXUs of the base device's integrated adapter device, where such an adapter controller can exist in several forms on its respective user or base device, such as a dedicated silicon chip. When a user device with an integrated adapter is communicatively coupled via one or more contactless links with a base device with an integrated adapter, the two devices may automatically perform a prescribed transfer of data across the link. Immediately prior to the transfer, the integrated adapters may isolate their respective memory components from their respective host memory as a security measure (e.g., the adapter memory component of the user device may be isolated from the user device memory and the adapter memory component of the base device may be isolated from the base device memory). That isolation may be an essential and key differentiator of this architecture, as it may enable data to be quarantined from each host memory device, such that each host device (e.g., user device 810 and base device 870) can decide post-transaction what to do with the new data on its respective adapter memory component. The two host devices that are sharing data from their respective adapter memory components may not be directly coupled to each other (e.g., from user device memory 814 to base device memory 874). Instead, the integrated adapter memory components act as a firewall to prevent one host device from hijacking the other.

Therefore, a method of communication may be provided that uses integrated adapter memory components (e.g., memory component 844) as the transmission medium, rather than a wire/cable connection between user device memory 814 and base device memory 874. The type of such data transfers can be layered for particular use cases, such as the following: (1) gesture-only, which can be used to pull (e.g., only pull) data into user device, with the only action being to simply position base device-adapter connector 862 in a functional relationship with base device connector 882 for establishing link 868, while no interaction with user device 810 (e.g., a user interface or any component thereof) may be required (e.g., the user interface of the user device and the user interface of the base device may be off and/or locked and the transfer may still occur), which may enable anyone to gather data (e.g., to enable any suitable localized data-push use case, such as promotional data (e.g., coupons, trailers), informational data (e.g., maps, guides), personal data (e.g., media content, DVR content, cameras), and DRM data (e.g., download movies, videos and unlock via cloud payment); (2) moderated gesture, which can be used by interacting with software (e.g., via a user interface of user device 810 enabled by a user device application 813) on one device, such that the transfer can be moderated to enable push and/or pull (e.g., once set up, the transactions can then occur with only a gesture (e.g., simply position base device-adapter connector 862 in a functional relationship with base device connector 882 for establishing link 868) so as to enable various use cases such as sharing media consecutively with several people, enabling a fixed purchasing credit, and handing user device 810 to a child to pick out a movie to download from a kiosk base device 870 (e.g., the initial interaction with software on user device 810 prior to the gesture may define limits on what movies the child may be able to download from kiosk base device 870 with the gesture)); and (3) interactive, which can be used when at least one of the devices, such as user device 810, is on and interacting with the user (e.g., via a user interface of user device 810 enabled by a user device application 813) while the devices are docked or otherwise communicatively coupled to each other (e.g., while adapter device 840 of user device 810 is communicatively coupled to base device 870 via contactless link), such that a user of the device may be directing what, where, and/or how data would move between the devices (e.g., for organizing a video library, streaming a movie out of the device, dragging and dropping files between the devices, etc.). In each case, the data may be strictly moved within the isolated adapter memory components of the devices. Once a transfer is complete (e.g., from base device 870 to memory 844 of adapter device 840), adapter memory component 844 may be reconnected to user device 810, where user device 810 can then test the new data recently transferred to adapter memory 844 (e.g., for malware, DRM, inappropriate content, etc.) before user device 810 may accept and/or use that data (e.g., transfer data first, ask questions later), which can help assure a consistent user experience for transfer rates, regardless of the capabilities of the host device.

Such embodiments can be achieved with no changes to the hardware or software or otherwise of a device using adapter device 840 (e.g., user device 810 and/or base device 870). Purpose-built apps (e.g., applications 813, 853, and/or 873) on a host device or otherwise can substantially enrich the user experience, provide data security, and/or enforce digital rights management. Adapter device 840 can be incorporated into a protective sleeve or cover or removable card or dongle or may be piggybacked onto wireless power modules or other components that may be coupled onto the inside of user device 810 (e.g., a smartphone). Such adapter device functionality can be implemented as a discrete silicon chip, such as an ASIC or FPGA. Additionally or alternatively, such adapter device functionality may be implemented with a high performance processor that may include a DMA engine built in, which may reduce the implementation largely to just firmware. Additionally or alternatively, such adapter device functionality may be implemented into a memory controller of the host device (e.g., of user device 810). Anyone or more of user device 810, adapter device 840, base device 870, and/or auxiliary device 890 may be a dongle.

In the interest of taking advantage of economies of scale and eliminating a need to custom design a specific sleeve adapter for all the potential user devices, it may be desirable to provide a modular adapter that can be universally accepted by any one of several device shells. FIGS. 10 and 11 show, respectively, an illustrative device specific shell 1500 that is configured to interface with illustrative modular adapter 1600 and a specific user device (not shown), according to various embodiments.

Device specific shell 1500 may represent one of a plethora of different shells that can be custom designed for any suitable number of user devices (e.g., user device 810, phones, or cameras). Device specific shell 1500 may be constructed so that it attaches to the user device in a particular manner. For example, shell 1500 may fully or partially surround a housing of the user device, or it may be attached to a particular region of the user device. Device specific shell 1500 may be a single piece or multiple piece construction. As a single piece, it may be able to securely retain modular adapter 1600 in place with respect to the user device and enable modular adapter 1600 to function as intended. For example, modular adapter 1600 may be placed inside a retaining region (not shown) of shell 1500 and the combination thereof can be secured to the user device. As a multiple piece construction, the pieces may be assembled together to securely retain modular adapter 1600 in place with respect to the user device and enable modular adapter 1600 to function as intended. For example, a first piece may have a retaining region for securing modular adapter 1600 and be configured to be attached to a first portion of the user device, and a second piece may be configured to be coupled to the first piece and to a second portion of the user device.

The material composition and construction of shell 1500 may be such that it complies with a set of criteria that enables operation of one or more EHF contactless units contained within modular adapter 1600. For example, shell 1500 may include one or more waveguides that facilitate propagation of EHF signals. Shell 1500 may include EHF conduit structures that contain EHF signals within one or more pathways. Shell 1500 may be constructed to have various dielectric and conductive materials to selectively shape and/or inhibit transmission of EHF signals.

Shell 1500 may include any number of connectors for interfacing with the user device and modular adapter 1600. One of the connectors may be designed to interface with a connector of the user device. Such a connector is illustrated as connector 1510, which can be a male connector designed to fit within a counterpart female connector of the user device. Another one of the connectors may be designed to interface with a connector of modular adapter 1600. For example, connector 1512 may be a female connector that interfaces with a counterpart male connector 1612 of adapter 1600. If desired, shell 1500 may include yet another connector, such as female connector 1514. Connector 1514 may be electrically coupled to the user device's female connector, to thereby enable a "pass through" connection between the user device and a device remote to the user device. Connectors 1510, 1512, and 1514 may be coupled to a printed circuit board and may be electrically interconnected via one more conductive paths.

Referring now to FIG. 11, modular adapter 1600 is discussed. Modular adapter 1600 may be similar in many respects to adapter device 840 of FIG. 3. For example, adapter 1600 may include memory/peripheral subsystem 1601, adapter host subsystem 1602, switch 1603, and contactless communication units 1604. In addition, modular adapter 1600 may include male connector 1612 that can interface with counterpart female connector 1512 of shell 1500. When modular adapter 1600 is coupled to device specific shell 1500 and the combination thereof is coupled to the user device, the user device is imparted with the functionality of module adapter 1600 (thereby providing the user device similar functionality as that imparted by adapter device 840 to user device 810).

FIG. 12 shows an illustrative schematic diagram in which user device 1700, device specific shell 1500, and modular adapter 1600 are all coupled together, in accordance with an embodiment. User device 1700 can have connector 1710 that is mated to connector 1510 of device specific sleeve 1500. Also shown are connectors 1514 and 1512, where connector 1612 is mated with connector 1512. This connection, along with connection between user device 1700 and sleeve 1500, enables user device 1700, for example, to access data stored in modular adapter 1600. Moreover, when module adapter 1600 is secured within sleeve 1500, it may be able to contactlessly communicate with a base device (not shown).

FIG. 13 shows an illustrative process 1800 for enabling an adapter device to communicate with a first electronic device and a second electronic device according to an embodiment. At step 1802, a first communications link between a first connector of the adapter device and the first electronic device may be established. At step 1804, a second connector of the adapter device may be mechanically coupled to the second electronic device for enabling a second communications link between the second connector of the adapter device and the second electronic device. Then, at step 1806, while both the first communications link is established and the second connector is mechanically coupled to the second electronic device, the state of a communications path between the second connector and a memory component of the adapter device may be changed. For example, as described above with respect to FIGS. 3 and 4, adapter device 840 may establish link 868 between connector 862 and base device 870 and connector 832 may be mechanically coupled to connector 822 of user device 810, which may enable link 831 between connector 832 and user device 810. Then, while both link 868 is established link 868 and connector 832 is mechanically coupled to connector 822 (e.g., not physically disconnected), adapter device 840 may change the state of a communication path between connector 832 and memory component 844 (e.g., switch 851*a* may decouple a path between switch 851*a* and connector 832 from a path between switch 851*a* and the upstream port of hub 900 (and, thus, memory component 844). Adapter 840 may change this state whether or not link 831 between connectors 822 and 832 is communicating any data and/or power.

It should be understood that the steps shows in FIG. 13 are merely illustrative and that additional steps may be added, steps may be omitted, and the order of steps can be rearranged.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description may include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-13, as well as any other aspects of the disclosure, may each be implemented by software, but may also be implemented in hardware, firmware, or any combination of software, hardware, and firmware. Instructions for performing these processes may be embodied as machine- or computer-readable code that may be recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device. In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A camera comprising:
   an integrated adapter comprising:
      an electro-mechanical connector for establishing an electrical-mechanical connection with a first device; and
      a first communication unit (CU) configured to establish a first communications link by exchanging extremely high frequency (EHF) electromagnetic signals with a second CU of a second device when the second device is attached to the camera;
   a controller operative to:
      exchange electrical signals with the first device when the first device is connected to the electro-mechanical connector; and
      communicate with the second device according to a first communications protocol when the second device is attached to the camera and the first communication link is established.

2. The camera of claim 1, wherein the first communications link is a wireless link that has a communications range of less than 5 centimeters.

3. The camera of claim 1, wherein the first communications protocol is a universal serial bus (USB) protocol.

4. The camera of claim 1, wherein the controller is configured to utilize an application programming interface to communicate with the second device according to the first communications protocol.

5. The camera of claim 1, further comprising a memory, and the controller is configured to enable a first communications path between the first communications link and the memory.

6. The camera of claim 5, wherein the controller is configured to provide direct memory access (DMA) to the memory via the first communications path.

7. The camera of claim 1, wherein the first device is a memory storage device.

8. The camera of claim 7, wherein the first communications protocol includes a plurality of first communications protocol versions, and the controller is configured to utilize the first communications protocol version selected from among the plurality of first communications protocol versions in accordance with a compatibility of the second device.

9. The camera of claim 8, wherein the plurality of first communications protocol versions include USB 2.0, USB 3.0, USB 3.1, USB Type C, PCI express, and/or USB 3/2 auto-switchable protocols.

10. The camera of claim 1, wherein the second device is a visual display device.

11. The camera of claim 10, wherein the first communications protocol comprises DisplayPort.

12. A system comprising:
   a first device comprising:
      a first housing;
      a display contained within the first housing;
      a first communication unit (CU) associated with the display;
      a second CU associated with the first housing; and
      a first electro-mechanical connector associated with the first housing and electrically connected to the second CU; and
   a second device comprising:
      a second housing distinct from the first housing;
      a second electro-mechanical connector associated with the second housing and configured to connect to the first electro-mechanical connector when the second housing is attached to the first housing; and
      a controller operative to drive the display on the first device according to a DisplayPort communications protocol when a communications link is established between the first CU and the second CU, wherein the communications link is established by exchanging extremely high frequency (EHF) electromagnetic signals between the first CU and the second CU, and wherein display data is provided from the controller to the second CU via the connection between the first electro-mechanical connector and the second electro-mechanical connector.

13. The system of claim 12, wherein:
   the first housing is configured to attach to the second housing in an attached state; and the first CU is configured to establish the communications link while in the attached state.

14. The system of claim 12, wherein the second device comprises a display, wherein the controller is operative to drive the display on the second device.

* * * * *